United States Patent
Zhu et al.

(10) Patent No.: US 11,122,578 B2
(45) Date of Patent: Sep. 14, 2021

(54) DATA TRANSMISSION METHOD AND APPARATUS

(71) Applicant: HUAWEI TECHNOLOGIES CO., LTD., Guangdong (CN)

(72) Inventors: Jun Zhu, Shanghai (CN); Yingpei Lin, Shanghai (CN); Jun Luo, Shanghai (CN); Jiyong Pang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 8 days.

(21) Appl. No.: 15/956,952

(22) Filed: Apr. 19, 2018

(65) Prior Publication Data

US 2018/0242331 A1    Aug. 23, 2018

Related U.S. Application Data

(63) Continuation of application No. PCT/CN2016/084310, filed on Jun. 1, 2016.

(30) Foreign Application Priority Data

Oct. 20, 2015 (CN) .......................... 201510680806.4

(51) Int. Cl.
*H04W 72/08* (2009.01)
*H04J 11/00* (2006.01)
(Continued)

(52) U.S. Cl.
CPC ............ *H04W 72/082* (2013.01); *H04B 7/02* (2013.01); *H04B 7/0697* (2013.01);
(Continued)

(58) Field of Classification Search
CPC ........... H04W 72/082; H04W 72/0413; H04W 74/0816; H04W 72/042; H04L 5/0073; H04J 11/005
See application file for complete search history.

(56) References Cited

U.S. PATENT DOCUMENTS 8,054,781 B2    11/2011  Helbig
8,391,882 B2     3/2013  Sampath et al.
(Continued)

FOREIGN PATENT DOCUMENTS

CN      1833409 A    9/2006
CN    102892120 A    1/2013
(Continued)

OTHER PUBLICATIONS

Extended European Search Report issued in European Application No. 16856617.2 dated Sep. 4, 2018, 12 pages.
(Continued)

*Primary Examiner* — Min Jung
(74) *Attorney, Agent, or Firm* — Fish & Richardson P.C.

(57) ABSTRACT

The present invention discloses a data transmission method and apparatus. The method includes: generating, by the primary access point, spatial reuse transmission signaling, the spatial reuse transmission signaling is used to indicate a reuse transmission device of the spatial reuse link to perform data transmission based on the spatial reuse link according to the spatial reuse transmission signaling; sending, by the primary access point, the spatial reuse transmission signaling. According to the data transmission method and apparatus in embodiments of the present invention, mutual interference between the primary link and the spatial reuse link during data transmission can be reduced, and transmission quality can be improved.

6 Claims, 7 Drawing Sheets

(51) Int. Cl.
- *H04L 5/00* (2006.01)
- *H04B 7/06* (2006.01)
- *H04W 52/00* (2009.01)
- *H04B 7/02* (2018.01)
- *H04W 72/04* (2009.01)
- *H04W 74/08* (2009.01)
- *H04W 92/10* (2009.01)

(52) U.S. Cl.
CPC .......... *H04J 11/005* (2013.01); *H04L 5/0044* (2013.01); *H04L 5/0053* (2013.01); *H04L 5/0073* (2013.01); *H04L 5/0092* (2013.01); *H04W 52/00* (2013.01); *H04W 72/042* (2013.01); *H04W 72/0413* (2013.01); *H04W 74/0816* (2013.01); *H04L 5/0037* (2013.01); *H04W 92/10* (2013.01)

(56) References Cited

U.S. PATENT DOCUMENTS

| | | | |
|---|---|---|---|
| 9,801,097 B2* | 10/2017 | Kim | H04W 16/28 |
| 10,172,137 B1* | 1/2019 | Hedayat | H04W 74/02 |
| 2006/0217067 A1 | 9/2006 | Helbig | |
| 2010/0099431 A1 | 4/2010 | Sampath et al. | |
| 2012/0113975 A1* | 5/2012 | Kim | H04W 16/28 370/348 |
| 2014/0018116 A1 | 1/2014 | Novak et al. | |
| 2014/0328270 A1 | 11/2014 | Zhu et al. | |
| 2015/0103654 A1 | 4/2015 | Lee et al. | |
| 2015/0119064 A1 | 4/2015 | Takano et al. | |
| 2015/0382360 A1* | 12/2015 | Huang | H04W 72/082 370/329 |
| 2016/0044704 A1* | 2/2016 | Li | H04W 4/70 370/330 |
| 2016/0127909 A1* | 5/2016 | Huang | H04L 5/0062 370/329 |
| 2016/0316468 A1* | 10/2016 | Huang | H04L 45/74 |
| 2017/0064644 A1* | 3/2017 | Cariou | H04W 52/243 |
| 2017/0070962 A1* | 3/2017 | Wang | H04W 52/50 |
| 2018/0139635 A1* | 5/2018 | Oteri | H04W 74/006 |
| 2018/0146469 A1 | 5/2018 | Luo et al. | |
| 2018/0220456 A1* | 8/2018 | Kim | H04W 74/0808 |
| 2018/0227952 A1* | 8/2018 | Kim | H04W 74/0816 |
| 2018/0242362 A1* | 8/2018 | Kim | H04W 74/0816 |
| 2020/0154476 A1* | 5/2020 | Kim | H04W 48/16 |

FOREIGN PATENT DOCUMENTS

| | | |
|---|---|---|
| CN | 103548393 A | 1/2014 |
| CN | 104284441 A | 1/2015 |
| CN | 104429141 A | 3/2015 |
| CN | 104823400 A | 8/2015 |
| EP | 2689611 A1 | 1/2014 |
| EP | 2858400 A1 | 4/2015 |
| EP | 3125635 A1 | 2/2017 |
| EP | 3307007 A1 | 4/2018 |
| KR | 20090099084 A | 9/2009 |
| KR | 20100092103 A | 8/2010 |
| RU | 2450483 C2 | 5/2012 |
| WO | 2012126082 A1 | 9/2012 |
| WO | 2014158235 A1 | 10/2014 |
| WO | 2014159235 A1 | 10/2014 |
| WO | 2014190275 A1 | 11/2014 |
| WO | 2014210401 A2 | 12/2014 |
| WO | 2015112780 A1 | 7/2015 |
| WO | 2016126395 A1 | 8/2016 |
| WO | 2016176550 A1 | 11/2016 |
| WO | 2017012182 A1 | 1/2017 |
| WO | 2017018801 A1 | 2/2017 |

OTHER PUBLICATIONS

IEEE 802.11-15/0132r8,Robert Stacey,"Specification Framework for TGax",IEEE P802.11Wireless LANs,Intel,dated Sep. 22,total 22 pages.
International Search Report issued in International Application No. PCT/CN2016/084310 dated Aug. 24, 2016, 13 pages.
Australian Examination Report issued in Australian Application No. 2016343378 dated Feb. 26, 2019, 6 pages.
Russian Office Action issued in Russian Application No. 2018118165107(028351) dated Nov. 28, 2018, 13 pages.
IEEE Computer Society, "IEEE Standard for Information technology, Local and metropolitan area networks, Specific requirements Part 11: Wireless LAN Medium Access Control (MAC) and Physical Layer (PHY) Specifications Amendment 4: Protected Management Frames," IEEE Std 802.11w-2009, Sep. 30, 2009, 111 pages.
PCT International Search Report and Written Opinion issued in International Application No. PCT/CN2016/084310 dated Aug. 24, 2016, 19 pages (with English translation).
Examination Report issued in Australian Application No. 2016343378 dated Sep. 2, 2019, 8 pages.
Office Action issued in Chinese Application No. 201510680806.4 dated Feb. 3, 2020, 15 pages (with English translation).
Office Action issued in Korean Application No. 2018-7013701 dated Mar. 30, 2020, 3 pages (with English translation).
Office Action issued in Brazilian Application No. BR112018008030-6 dated Aug. 4, 2020, 2 pages.
Office Action issued in Chinese Application No. 202011279206.4 dated Jul. 27, 2021, 6 pages.

* cited by examiner

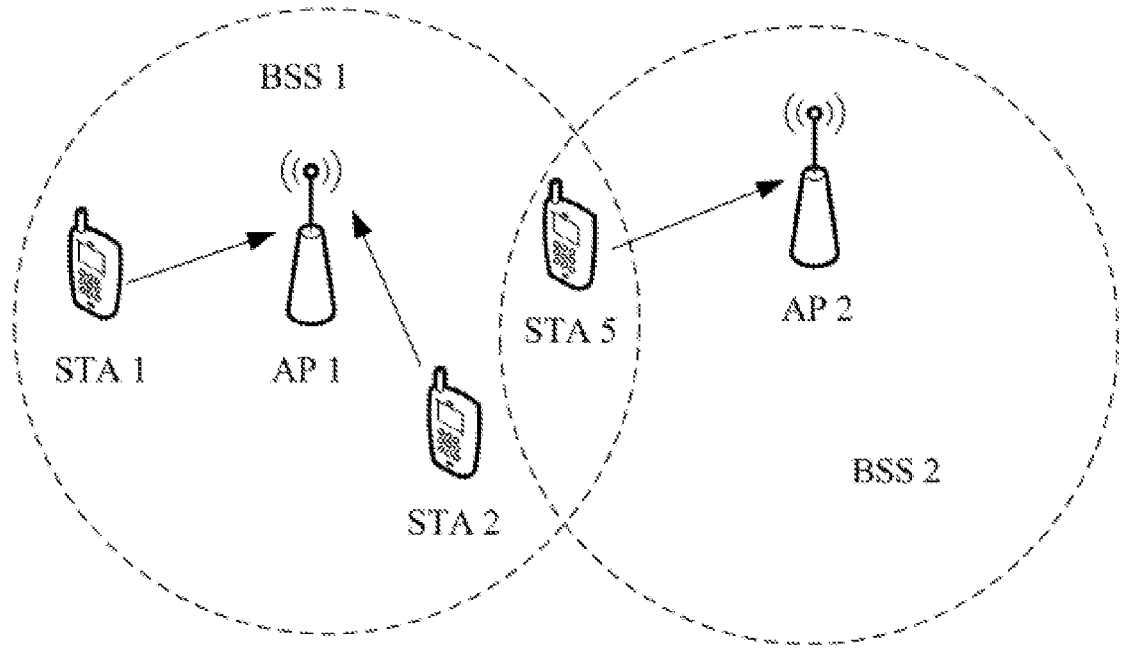

A primary access point determines a determining parameter  ~ S110

The primary access point performs, according to the determining parameter, determining processing on whether a reuse transmission device of a spatial reuse link is allowed to use an all or some of time-frequency resources of a primary link to transmit data, and generates spatial reuse transmission signaling corresponding to a determining result obtained after the determining processing  ~ S120

The primary access point sends the spatial reuse transmission signaling, so that the reuse transmission device performs, according to the spatial reuse transmission signaling, data transmission processing based on the spatial reuse link  ~ S130

A primary station receives spatial reuse transmission signaling sent by a primary access point, where the spatial reuse transmission signaling is used by a reuse transmission device of a spatial reuse link to determine whether to use all or some of time-frequency resources of a primary link to perform data transmission processing based on the spatial reuse link   ∽ S210

The primary station sends an uplink data frame, where the uplink data frame carries the spatial reuse transmission signaling   ∽ S220

FIG. 5

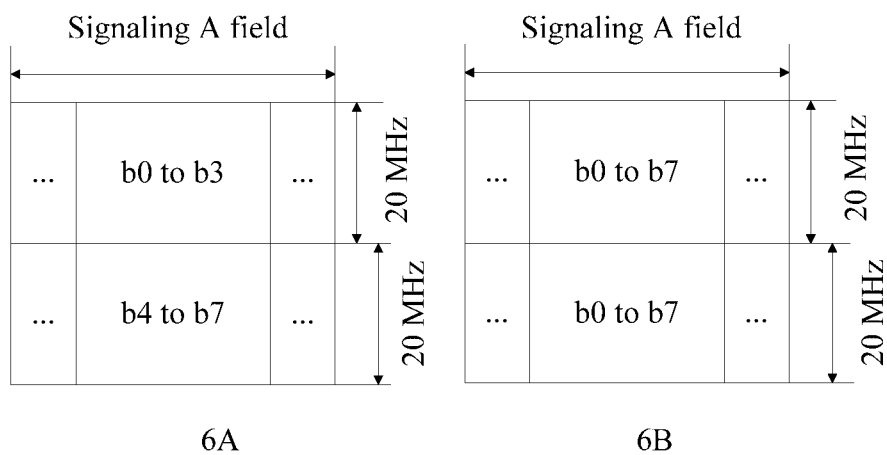

FIG. 6

DATA TRANSMISSION METHOD AND APPARATUS

CROSS-REFERENCE TO RELATED APPLICATIONS

This application is a continuation of International Application No. PCT/CN2016/084310, filed on Jun. 1, 2016, which claims priority to Chinese Patent Application No. 201510680806.4, filed on Oct. 20, 2015. The disclosures of the aforementioned applications are hereby incorporated by reference in their entireties.

TECHNICAL FIELD

Embodiments of the present invention relate to the communications field, and more specifically, to a data transmission method and apparatus.

BACKGROUND

In some networks, for example, in a wireless local area network (WLAN), to avoid interference caused by collision during data transmission, a carrier sense multiple access with collision avoidance CSMA/CA) channel access mechanism is used. According to the CSMA/CA mechanism, after finishing sending a frame, each station STA) needs to wait for a very short time period before sending a next frame. This time period is referred to as an interframe gap. A length of the interframe gap depends on a type of a frame to be sent by the station. A high-priority frame has a relatively short interframe gap, and a low-priority frame has a relatively long interframe gap. That is, the high-priority frame has a relatively short sending wait time, and the low-priority frame has a relatively long wait time. Therefore, compared with the low-priority frame, the high-priority frame can preferentially obtain sending rights. That is, if the low-priority frame is not sent and the high-priority frame starts to be sent, that is, a channel state is a busy state, the low-priority frame is prohibited from being sent; and after the high-priority frame is sent, that is, the channel state is an idle state, sending of the low-priority frame is allowed. Therefore, only one STA performs sending in a time period by using a channel, to avoid collision.

With the development of communications technologies, to improve a system throughput in an intensive scenario, a concept of spatial reuse SR) is introduced. In a specific scenario or under a specific condition, two or more stations are allowed to use a same time-frequency resource (that is, use a same channel in a same time period) for transmission. For example, as shown in FIG. 1, when a STA 1 and a STA 2 send uplink data to an access point (AP) AP 1 (a link between the AP 1 and the STA 1 and a link between the AP 1 and the STA 2 are collectively referred to as a primary link below), a STA 5 transmits data to an access point AP 2 by using all or some of time-frequency resources of the primary link (a link between the AP 2 and the STA 5 is referred to as a spatial reuse link below). Because data transmission on the spatial reuse link occupies all or some of the time-frequency resources of the primary link, it cannot ensure that only one STA sends data in a time period by using a channel. Consequently, introduction of the spatial reuse increases mutual interference between links, and affects transmission quality.

Therefore, an effective interference control mechanism is required, to reduce interference between the primary link and the spatial reuse link, and improve transmission quality.

SUMMARY

The present invention provides a data transmission method and apparatus, to reduce mutual interference between a primary link and a spatial reuse link during data transmission, and improve transmission quality.

A first aspect provides a data transmission method, the method is applied to a communications system that includes a primary link and a spatial reuse link for data transmission, the primary link is set between a primary access point and a primary station, and the method includes: performing, by the primary access point, determining processing according to a determining parameter, where the determining processing is used to determine whether a reuse transmission device of the spatial reuse link is allowed to use all or some of time-frequency resources of the primary link to transmit data; generating, by the primary access point, spatial reuse transmission signaling according to a determining result obtained after the determining processing; and sending, by the primary access point, the spatial reuse transmission signaling, so that the reuse transmission device performs, according to the spatial reuse transmission signaling, data transmission processing based on the spatial reuse link.

With reference to the first aspect, in a first implementation of the first aspect, the spatial reuse transmission signaling includes first spatial reuse transmission signaling that is used to indicate that the reuse transmission device is prohibited from using all or some of the time-frequency resources of the primary link; or the spatial reuse transmission signaling includes second spatial reuse transmission signaling that is used to indicate that the reuse transmission device is allowed to use all or some of the time-frequency resources of the primary link.

With reference to the first aspect and the foregoing implementation of the first aspect, in a second implementation of the first aspect, the performing, by the primary access point, determining processing according to the determining parameter includes: performing, by the primary access point, determining processing according to N determining parameters, where the N determining parameters are in a one-to-one correspondence with N transmission sub-bandwidths of the primary link, each determining parameter is used to determine whether the reuse transmission device is allowed to use a corresponding transmission sub-bandwidth, and N≥2; and the generating, by the primary access point, spatial reuse transmission signaling according to a determining result obtained after the determining processing includes: generating, by the primary access point, N pieces of spatial reuse transmission signaling according to the determining result obtained after the determining processing, where the N pieces of spatial reuse transmission signaling are in a one-to-one correspondence with the N transmission sub-bandwidths.

With reference to the first aspect and the foregoing implementations of the first aspect, in a third implementation of the first aspect, the sending, by the primary access point, the spatial reuse transmission signaling includes: sending, by the primary access point, the spatial reuse transmission signaling to the primary station, so that the primary station adds the spatial reuse transmission signaling to an uplink data frame when sending the uplink data frame, and the reuse transmission device obtains the spatial reuse transmission signaling from the uplink data frame.

With reference to the first aspect and the foregoing implementations of the first aspect, in a fourth implementation of the first aspect, when the result obtained after the determining processing is that the reuse transmission device is allowed to use all or some of the time-frequency resources of the primary link, the spatial reuse transmission signaling includes power indication information, where the power indication information is used by the reuse transmission device to determine maximum transmit power that can be used when the reuse transmission device uses all or some of the time-frequency resources of the primary link to transmit data.

With reference to the first aspect and the foregoing implementations of the first aspect, in a fifth implementation of the first aspect, before the performing, by the primary access point, determining processing according to a determining parameter, the method further includes: determining, by the primary access point, the determining parameter according to a transmission parameter used by the primary station, where the transmission parameter includes transmit power, a modulation and coding scheme MCS, and a transmission bandwidth.

With reference to the first aspect and the foregoing implementations of the first aspect, in a sixth implementation of the first aspect, the determining parameter is maximum interference power that is allowed when the primary access point receives the uplink data frame sent by the primary station.

With reference to the first aspect and the foregoing implementations of the first aspect, in an eighth implementation of the first aspect, the communications system includes at least two primary stations, and the determining, by the primary access point, the maximum interference power according to a transmission parameter used by the primary station includes: determining, by the primary access point according to transmission parameters used by all of the at least two primary stations, maximum interference power densities that are allowed when the primary access point receives uplink data frames sent by all of the at least two primary stations;

determining, by the primary access point, a minimum value from the maximum interference power densities; and determining, by the primary access point, the maximum interference power according to the minimum value.

With reference to the first aspect and the foregoing implementations of the first aspect, in a seventh implementation of the first aspect, the determining, by the primary access point according to transmission parameters used by all of the at least two primary stations, maximum interference power densities that are allowed when the primary access point receives uplink data frames sent by all of the at least two primary stations includes:

determining, by the primary access point according to a formula $$isd_{STAk} = \frac{\left(\frac{P^{Tx}_{STAk}}{L_{STAk}}\right)}{SINR^{required}_{STAk}} \cdot \frac{1}{BW_{STAk}},$$

a maximum interference power density that is allowed when the primary access point receives an uplink data frame sent by a station k in the at least two primary stations, where $isd_{STAk}$ indicates the maximum interference power density that is allowed when the primary access point receives the uplink data frame sent by the station k, $P_{STAk}^{Tx}$ indicates transmit power used by the station k to send the uplink data frame, $SINR_{STAk}^{required}$ indicates a minimum signal to interference plus noise ratio that is required when the primary access point receives the uplink data frame sent by the station k, and $BW_{STAk}$ indicates a transmission bandwidth used when the station k sends the uplink data frame.

With reference to the first aspect and the foregoing implementations of the first aspect, in a ninth implementation of the first aspect, the determining, by the primary access point, the maximum interference power according to the minimum value includes:

determining the maximum interference power on a transmission bandwidth of the primary link according to a formula $$I_{max\_level} = \min_{STAk}\{isd_{STAk}\} \cdot BW_{total}/\text{Redundancy};$$

or determining maximum interference power on an $m^{th}$ sub-bandwidth in the N transmission sub-bandwidths according to a formula $$I^m_{max\_level} = \min_{STAk\{m^{th}sub\text{-}band\}}\{isd_{STAk}\} \cdot BW^m/\text{Redundancy},$$

where $I_{max\_level}$ indicates the maximum interference power, $$\min_{STAk}\{isd_{STAk}\}$$

indicates the minimum value determined by the primary access point from the maximum interference power densities, $BW_{total}$ indicates the transmission bandwidth of the primary link, Redundancy indicates a redundancy reserved in the system, $I_{max\_level}^m$ indicates the maximum interference power on the $m^{th}$ sub-bandwidth, $BW^m$ indicates the $m^{th}$ sub-bandwidth in the N transmission sub-bandwidths, N≥2, and 1≤m≤N.

With reference to the first aspect and the foregoing implementations of the first aspect, in an tenth implementation of the first aspect, the sending, by the primary access point, the spatial reuse transmission signaling to the primary station includes: sending, by the primary access point, a trigger frame, where a signaling A field or load information of the trigger frame carries the spatial reuse transmission signaling.

A second aspect provides a data transmission method, the method is applied to a communications system in which a primary link and a spatial reuse link are used for data transmission, the primary link is set between a primary access point and a primary station, and the method includes: receiving, by the primary station, spatial reuse transmission signaling sent by the primary access point, where the spatial reuse transmission signaling is used by a reuse transmission device of the spatial reuse link to determine whether to use all or some of time-frequency resources of the primary link to perform data transmission processing based on the spatial reuse link; and sending, by the primary station, an uplink data frame to the primary access point, where the uplink data frame carries the spatial reuse transmission signaling.

With reference to the second aspect, in a first implementation of the second aspect, the spatial reuse transmission signaling includes first spatial reuse transmission signaling that is used to indicate that the reuse transmission device is prohibited from using all or some of the time-frequency resources of the primary link; or the spatial reuse transmission signaling includes second spatial reuse transmission signaling that is used to indicate that the reuse transmission device is allowed to use all or some of the time-frequency resources of the primary link.

With reference to the second aspect and the foregoing implementation of the second aspect, in a second implementation of the second aspect, wherein there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and N≥2; and the sending, by the primary station, an uplink data frame to the primary access point, wherein the uplink data frame carries the spatial reuse transmission signaling comprises:

adding, by the primary station, the N pieces of spatial reuse transmission signaling to a signaling A field of an uplink data frame on each of the N transmission sub-bandwidths, wherein N≥2; or adding, by the primary station to a signaling A field of an uplink data frame on an $m^{th}$ transmission sub-bandwidth in the N transmission sub-bandwidths, an $m^{th}$ piece of spatial reuse transmission signaling corresponding to the $m^{th}$ transmission sub-bandwidth, wherein 1≤m≤N, and both m and N are positive integers.

With reference to the second aspect and the foregoing implementations of the second aspect, in a third implementation of the second aspect, wherein the spatial reuse transmission signaling comprises power indication information, wherein the power indication information is used by the reuse transmission device to determine maximum transmit power that can be used when the reuse transmission device uses all or some of the time-frequency resources of the primary link to transmit data.

With reference to the second aspect and the foregoing implementations of the second aspect, in a fourth implementation of the second aspect, the spatial reuse transmission signaling includes power indication information, where the power indication information is used by the reuse transmission device to determine maximum transmit power that can be used when the reuse transmission device uses all or some of the time-frequency resources of the primary link to transmit data.

With reference to the second aspect and the foregoing implementations of the second aspect, in a fifth implementation of the second aspect, the spatial reuse transmission signaling is determined by the primary access point according to a determining parameter, where the determining parameter is maximum interference power that is allowed when the primary access point receives the uplink data frame sent by the primary station.

A third aspect provides a data transmission method, the method is applied to a communications system in which a primary link and a spatial reuse link are used for data transmission, the primary link is set between a primary access point and a primary station, and the method includes: receiving, by a reuse transmission device, first spatial reuse transmission signaling, where the first spatial reuse transmission signaling is used by the reuse transmission device of the spatial reuse link to determine whether to use all or some of time-frequency resources of the primary link to perform data transmission processing based on the spatial reuse link; and performing, by the reuse transmission device according to the spatial reuse transmission signaling, data transmission processing based on the spatial reuse link.

With reference to the third aspect, in a first implementation of the third aspect, the spatial reuse transmission signaling includes second spatial reuse transmission signaling that is used to prohibit the reuse transmission device from using all or some of the time-frequency domain resources of the primary link to transmit data; and the performing, by the reuse transmission device according to the spatial reuse transmission signaling, data transmission processing based on the spatial reuse link includes: giving up, by the reuse transmission device according to the second spatial reuse transmission signaling, using all or some of the time-frequency resources of the primary link to transmit data.

With reference to the third aspect and the foregoing implementation of the third aspect, in a second implementation of the third aspect, the spatial reuse transmission signaling includes third spatial reuse transmission signaling that is used to allow the reuse transmission device to use all or some of the time-frequency domain resources of the primary link to transmit data; and the performing, by the reuse transmission device according to the spatial reuse transmission signaling, data transmission processing based on the spatial reuse link includes: performing, by the reuse transmission device according to the third spatial reuse transmission signaling, data transmission processing based on the spatial reuse link.

With reference to the third aspect and the foregoing implementations of the third aspect, in a third implementation of the third aspect, there are N pieces of spatial reuse transmission signaling, the N pieces of spatial reuse transmission signaling are obtained after the primary access point performs determining processing according to N first determining parameters, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and N≥2; and the performing, by the reuse transmission device according to the spatial reuse transmission signaling, data transmission processing based on the spatial reuse link includes: performing, by the reuse transmission device according to the N pieces of spatial reuse transmission signaling, data transmission processing based on the spatial reuse link.

With reference to the third aspect and the foregoing implementations of the third aspect, in a fourth implementation of the third aspect, when a result obtained after the determining processing is that the reuse transmission device of the spatial reuse link is allowed to use all or some of the time-frequency resources of the primary link to transmit data, the spatial reuse transmission signaling includes power indication information; and the performing, by the reuse transmission device according to the spatial reuse transmission signaling, data transmission processing based on the spatial reuse link includes: determining, by the reuse transmission device according to the power indication information, maximum transmit power that can be used when the reuse transmission device uses all or some of the time-frequency resources of the primary link to transmit data, and transmitting data by using transmit power that is not greater than the maximum transmit power.

With reference to the third aspect and the foregoing implementations of the third aspect, in a fifth implementation of the third aspect, the spatial reuse transmission signaling is determined by the primary access point according to a first determining parameter, where the first determining parameter is determined by the primary access point according to a transmission parameter used by the primary station, and the transmission parameter includes transmit power, a modulation and coding scheme MCS, and a transmission bandwidth.

With reference to the third aspect and the foregoing implementations of the third aspect, in a sixth implementation of the third aspect, the reuse transmission device and the primary access point belong to different basic service sets BSSs.

With reference to the third aspect and the foregoing implementations of the third aspect, in a seventh implementation of the third aspect, the reuse transmission device and the primary access point belong to a same basic service set BSS, and the spatial reuse link is used for D2D transmission between stations in the BSS.

With reference to the third aspect and the foregoing implementations of the third aspect, in an eighth implementation of the third aspect, the performing, by the reuse transmission device according to the spatial reuse transmission signaling, data transmission processing based on the spatial reuse link includes: adding, by the reuse transmission device, D2D transmission indication information to a data frame during the D2D transmission, where the D2D transmission indication information is used to prohibit a D2D station in the BSS except the reuse transmission device from using this D2D transmission opportunity.

With reference to the third aspect and the foregoing implementations of the third aspect, in a ninth implementation of the third aspect, the first determining parameter is maximum interference power that is allowed when the primary access point receives an uplink data frame sent by the primary station.

With reference to the third aspect and the foregoing implementations of the third aspect, in a tenth implementation of the third aspect, the determining, by the reuse transmission device according to the first determining parameter, maximum transmit power that can be used when the reuse transmission device uses all or some of the time-frequency resources of the primary link to transmit data includes: determining the maximum transmit power according to a formula $P_{SR\_max}^{Tx} = \tilde{I}_{max\_level} \cdot L_{SR}$, where $P_{SR\_max}^{Tx}$ indicates the maximum transmit power, $\tilde{I}_{max\_level}$ indicates the maximum interference power, and $L_{SR}$ indicates a loss during transmission from the reuse transmission device to the primary access point.

With reference to the third aspect and the foregoing implementations of the third aspect, in an eleventh implementation of the third aspect, the communications system further includes a third-party device, and the method further includes: generating, by the reuse transmission device, fourth spatial reuse transmission signaling, where the fourth spatial reuse transmission signaling is used to prohibit the third-party device from using this reuse transmission opportunity; and adding, by the reuse transmission device, the fourth spatial reuse transmission signaling to the data frame during the data transmission, so that the third-party device gives up using this reuse transmission opportunity to transmit data when receiving the fourth spatial reuse transmission signaling.

A fourth aspect provides a data transmission apparatus, the apparatus is applied to a communications system that includes a primary link and a spatial reuse link for data transmission, the primary link is set between the apparatus and a primary station, and the apparatus includes: a judging module, configured to perform determining processing according to a determining parameter, where the determining processing is used to determine whether a reuse transmission device of the spatial reuse link is allowed to use all or some of time-frequency resources of the primary link to transmit data; a generation module, configured to generate spatial reuse transmission signaling according to a determining result obtained after the judging module performs determining processing; and a sending module, configured to send the spatial reuse transmission signaling generated by the generation module, so that the reuse transmission device performs, according to the spatial reuse transmission signaling, data transmission processing based on the spatial reuse link.

With reference to the fourth aspect, in a first implementation of the fourth aspect, the generation module is further configured to: generate first spatial reuse transmission signaling that is used to indicate that the reuse transmission device is prohibited from using all or some of the time-frequency resources of the primary link to transmit data; or generate second spatial reuse transmission signaling that is used to indicate that the reuse transmission device is allowed to use all or some of the time-frequency resources of the primary link to transmit data.

With reference to the fourth aspect and the foregoing implementation of the fourth aspect, in a second implementation of the fourth aspect, the judging module is further configured to perform determining processing according to N determining parameters, where the N determining parameters are in a one-to-one correspondence with N transmission sub-bandwidths of the primary link, each determining parameter is used to determine whether the reuse transmission device is allowed to use a corresponding transmission sub-bandwidth, and $N \geq 2$; and the generation module is further configured to generate N pieces of spatial reuse transmission signaling according to the determining result obtained after the determining processing, where the N pieces of spatial reuse transmission signaling are in a one-to-one correspondence with the N transmission sub-bandwidths.

With reference to the fourth aspect and the foregoing implementations of the fourth aspect, in a third implementation of the fourth aspect, the sending module is further configured to send the spatial reuse transmission signaling to the primary station, so that the primary station adds the spatial reuse transmission signaling to an uplink data frame when sending the uplink data frame, and the reuse transmission device obtains the spatial reuse transmission signaling from the uplink data frame.

With reference to the fourth aspect and the foregoing implementations of the fourth aspect, in a fourth implementation of the fourth aspect, the generation module is further configured to: when the result obtained after the determining processing is that the reuse transmission device is allowed to use all or some of the time-frequency resources of the primary link to transmit data, generate the spatial reuse transmission signaling that includes power indication information, where the power indication information is used by the reuse transmission device to determine maximum transmit power that can be used when the reuse transmission device uses all or some of the time-frequency resources of the primary link to transmit data.

With reference to the fourth aspect and the foregoing implementations of the fourth aspect, in a fifth implementation of the fourth aspect, the apparatus further includes a determining module, and the determining module is configured to: before the judging module performs determining processing, determine the determining parameter according to a transmission parameter used by the primary station, where the transmission parameter includes transmit power, a modulation and coding scheme MCS, and a transmission bandwidth.

With reference to the fourth aspect and the foregoing implementations of the fourth aspect, in a sixth implementation of the fourth aspect, the determining parameter is maximum interference power that is allowed when the apparatus receives the uplink data frame sent by the primary station.

With reference to the fourth aspect and the foregoing implementations of the fourth aspect, in a seventh implementation of the fourth aspect, the communications system includes at least two primary stations, and the determining module is further configured to: determine maximum interference power densities that are allowed when the apparatus receives uplink data frames sent by all of the at least two primary stations; determine a minimum value from the maximum interference power densities; and determine the maximum interference power according to the minimum value.

With reference to the fourth aspect and the foregoing implementations of the fourth aspect, in an eighth implementation of the fourth aspect, the determining module is further configured to: determine, according to a formula $$isd_{STAk} = \frac{\left(\frac{P^{Tx}_{STAk}}{L_{STAk}}\right)}{SINR^{required}_{STAk}} \cdot \frac{1}{BW_{STAk}},$$

a maximum interference power density that is allowed when an uplink data frame sent by a station k in the at least two primary stations is received, where $isd_{STAk}$ indicates the maximum interference power density that is allowed when the apparatus receives the uplink data frame sent by the station k, $P_{STAk}^{Tx}$ indicates transmit power used by the station k to send the uplink data frame, $SINR_{STAk}^{required}$ indicates a minimum signal to interference plus noise ratio that is required when the apparatus receives the uplink data frame sent by the station k, and $BW_{STAk}$ indicates a transmission bandwidth used when the station k sends the uplink data frame.

With reference to the fourth aspect and the foregoing implementations of the fourth aspect, in a ninth implementation of the fourth aspect, the determining module is further configured to: determine the maximum interference power on a transmission bandwidth of the primary link according to a formula $$I_{max\_level} = \min_{STAk}\{isd_{STAk}\} \cdot BW_{total}/\text{Redundancy},$$

or determine maximum interference power on an $m^{th}$ sub-bandwidth in the N transmission sub-bandwidths according to a formula $$I^m_{max\_level} = \min_{STAk \in \{m^{th}\ sub\text{-}band\}}\{isd_{STAk}\} \cdot BW^m/\text{Redundancy},$$

where $I_{max\_level}$ indicates the maximum interference power, $$\min_{STAk}\{isd_{STAk}\}$$

indicates the minimum value determined by the apparatus from the maximum interference power densities, $BW_{total}$ indicates the transmission bandwidth of the primary link, Redundancy indicates a redundancy reserved in the system, $I_{max\_level}^m$ indicates the maximum interference power on the $m^{th}$ sub-bandwidth, $BW^m$ indicates the $m^{th}$ sub-bandwidth in the N transmission sub-bandwidths, $N \geq 2$, $1 \leq m \leq N$, and both m and N are positive integers.

With reference to the fourth aspect and the foregoing implementations of the fourth aspect, in a tenth implementation of the fourth aspect, the sending module is further configured to send a trigger frame to the primary station, where a signaling A field or load information of the trigger frame carries the spatial reuse transmission signaling.

A fifth aspect provides a data transmission apparatus, the apparatus is applied to a communications system that includes a primary link and a spatial reuse link for data transmission, the primary link is set between the apparatus and a primary access point, and the apparatus includes: a receiving module, configured to receive spatial reuse transmission signaling sent by the primary access point, where the spatial reuse transmission signaling is used by a reuse transmission device of the spatial reuse link to determine whether to use all or some of time-frequency resources of the primary link to perform data transmission processing based on the spatial reuse link; and a sending module, configured to send an uplink data frame to the primary access point, where the uplink data frame carries the spatial reuse transmission signaling.

With reference to the fifth aspect, in a first implementation of the fifth aspect, the spatial reuse transmission signaling includes first spatial reuse transmission signaling that is used to indicate that the reuse transmission device is prohibited from using all or some of the time-frequency resources of the primary link to transmit data; or the spatial reuse transmission signaling includes second spatial reuse transmission signaling that is used to indicate that the reuse transmission device is allowed to use all or some of the time-frequency resources of the primary link to transmit data.

With reference to the fifth aspect and the foregoing implementation of the fifth aspect, in a second implementation of the fifth aspect, when there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and $N \geq 2$; and the N pieces of spatial reuse transmission signaling are added to a signaling A field of an uplink data frame on each of the N transmission sub-bandwidths, where $N \geq 2$; or an $m^{th}$ piece of spatial reuse transmission signaling corresponding to an $m^{th}$ transmission sub-bandwidth is added to a signaling A field of an uplink data frame on the $m^{th}$ transmission sub-bandwidth in the N transmission sub-bandwidths, where $m \geq 1$.

With reference to the fifth aspect and the foregoing implementations of the fifth aspect, in a third implementation of the fifth aspect, the spatial reuse transmission signaling includes power indication information, where the power indication information is used by the reuse transmission device to determine maximum transmit power that can be used when the reuse transmission device uses all or some of the time-frequency resources of the primary link to transmit data.

With reference to the fifth aspect and the foregoing implementations of the fifth aspect, in a fourth implementation of the fifth aspect, the spatial reuse transmission signaling is determined by the primary access point according to a determining parameter, where the determining parameter is maximum interference power that is allowed when the primary access point receives the uplink data frame sent by the apparatus.

A sixth aspect provides a data transmission apparatus, the apparatus is applied to a communications system that includes a primary link and a spatial reuse link for data transmission, the primary link is set between a primary access point and a primary station, and the apparatus includes: a receiving module, configured to receive first spatial reuse transmission signaling, where the first spatial reuse transmission signaling is used by a apparatus of the spatial reuse link to determine whether to use all or some of time-frequency resources of the primary link to perform data transmission processing based on the spatial reuse link; and a processing module, configured to perform, according to the spatial reuse transmission signaling received by the receiving module, data transmission processing based on the spatial reuse link.

With reference to the sixth aspect, in a first implementation of the sixth aspect, when the spatial reuse transmission signaling includes second spatial reuse transmission signaling that is used to prohibit the apparatus from using all or some of the time-frequency domain resources of the primary link to transmit data, the processing module is further configured to give up, according to the second spatial reuse transmission signaling, using all or some of the time-frequency resources of the primary link to transmit data.

With reference to the sixth aspect and the foregoing implementation of the sixth aspect, in a second implementation of the sixth aspect, when the spatial reuse transmission signaling includes third spatial reuse transmission signaling that is used to allow the apparatus to use all or some of the time-frequency domain resources of the primary link to transmit data, the processing module is further configured to perform, according to the third spatial reuse transmission signaling, data transmission processing based on the spatial reuse link.

With reference to the sixth aspect and the foregoing implementations of the sixth aspect, in a third implementation of the sixth aspect, there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the apparatus is allowed to use a corresponding transmission sub-bandwidth, and N≥2; and the processing module is further configured to perform, according to the N pieces of spatial reuse transmission signaling, data transmission processing based on the spatial reuse link.

With reference to the sixth aspect and the foregoing implementations of the sixth aspect, in a fourth implementation of the sixth aspect, the apparatus further includes: a determining module, configured to: when the spatial reuse transmission signaling includes power indication information, determine, according to the power indication information, maximum transmit power that can be used when the apparatus uses all or some of the time-frequency resources of the primary link to transmit data; and the apparatus further includes a transmission module, the transmission module is further configured to transmit data by using transmit power that is not greater than the maximum transmit power.

With reference to the sixth aspect and the foregoing implementations of the sixth aspect, in a fifth implementation of the sixth aspect, the spatial reuse transmission signaling is determined by the primary access point according to a first determining parameter, where the first determining parameter is determined by the primary access point according to a transmission parameter used by the primary station, and the transmission parameter includes transmit power, a modulation and coding scheme MCS, and a transmission bandwidth.

With reference to the sixth aspect and the foregoing implementations of the sixth aspect, in a sixth implementation of the sixth aspect, the apparatus and the primary access point belong to different basic service sets BSSs.

With reference to the sixth aspect and the foregoing implementations of the sixth aspect, in a seventh implementation of the sixth aspect, the apparatus and the primary access point belong to a same basic service set BSS, and the spatial reuse link is used for D2D transmission between stations in the BSS.

With reference to the sixth aspect and the foregoing implementations of the sixth aspect, in an eighth implementation of the sixth aspect, the processing module is further configured to add D2D transmission indication information to a data frame during the D2D transmission, where the D2D transmission indication information is used to prohibit a D2D station in the BSS except the apparatus from using this D2D transmission opportunity.

With reference to the sixth aspect and the foregoing implementations of the sixth aspect, in a ninth implementation of the sixth aspect, the first determining parameter is maximum interference power that is allowed when the apparatus receives an uplink data frame sent by the primary station.

With reference to the sixth aspect and the foregoing implementations of the sixth aspect, in a tenth implementation of the sixth aspect, the determining module is further configured to determine the maximum transmit power according to a formula $P_{SR\_max}^{Tx} = \tilde{I}_{max\_level} \cdot L_{SR}$, where $P_{SR\_max}^{Tx}$ indicates the maximum transmit power, $\tilde{I}_{max\_level}$ indicates the maximum interference power, and $L_{SR}$ indicates a loss during transmission from the apparatus to the primary access point.

With reference to the sixth aspect and the foregoing implementations of the sixth aspect, in an eleventh implementation of the sixth aspect, the communications system further includes a third-party device, and the apparatus further includes a generation module, where the generation module is configured to generate fourth spatial reuse transmission signaling, where the fourth spatial reuse transmission signaling is used to prohibit the third-party device from using this reuse transmission opportunity; and the processing module is further configured to add the fourth spatial reuse transmission signaling to the data frame during the data transmission, so that the third-party device gives up using this reuse transmission opportunity when receiving the fourth spatial reuse transmission signaling.

Based on the foregoing technical solutions, according to the data transmission method and apparatus in embodiments of the present invention, the primary access point determines, by using the determining parameter, whether the apparatus of the spatial reuse link is allowed to use all or some of the time-frequency resources of the primary link to transmit data; and generates the spatial reuse transmission signaling corresponding to the determining result obtained after the determining processing, so that after obtaining the spatial reuse transmission signaling, the apparatus performs data transmission processing based on the spatial reuse link. Therefore, mutual interference between the primary link and the spatial reuse link during data transmission can be reduced, and transmission quality can be improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic diagram of a communications system applicable to a data transmission method according to an embodiment of the present invention;

FIG. 2 is a schematic flowchart of a data transmission method according to an embodiment of the present invention;

FIG. 5 is a schematic flowchart of a data transmission method according to another embodiment of the present invention;

FIG. 6 is a schematic diagram of a format of spatial reuse transmission signaling according to an embodiment of the present invention;

DESCRIPTION OF EMBODIMENTS

Figure 3:
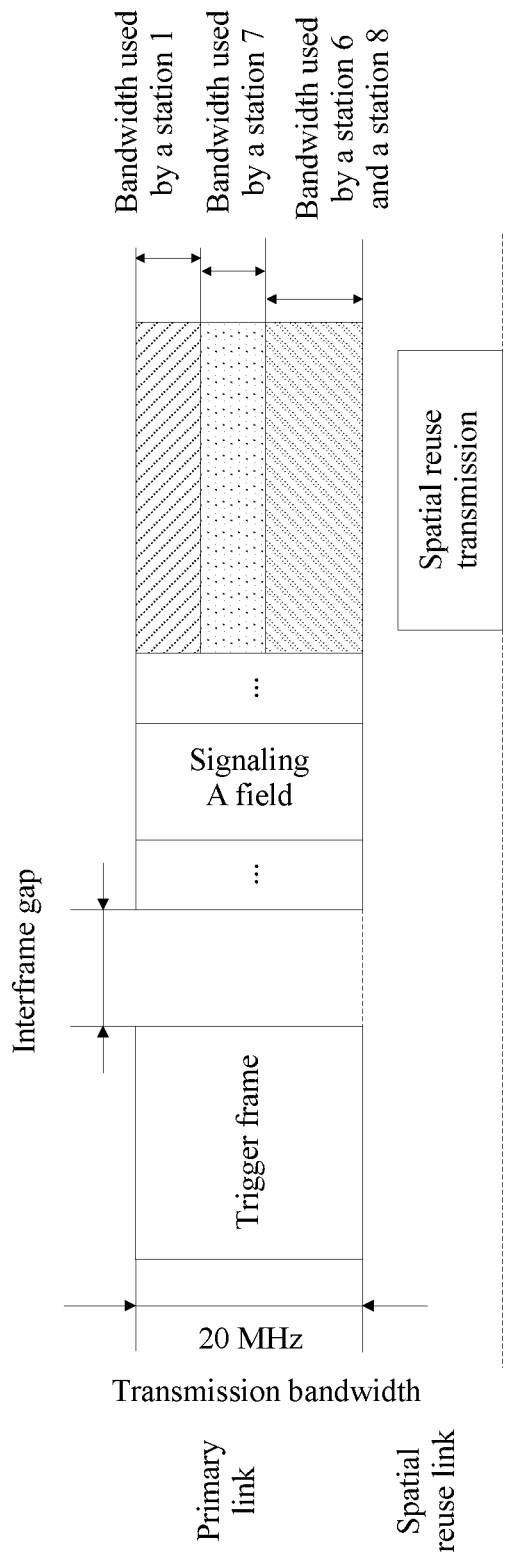
FIG. 3 is a schematic diagram of bandwidth allocation according to an embodiment of the present invention.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The technical solutions in the present invention may be applied to various communications systems that each include a primary link and a spatial reuse link for data transmission, for example, a wireless local area network (WLAN) system, and a Wireless Fidelity (Wi-Fi) system that is represented by 802.11a, 802.11b, 802.11g, 802.11n, and 802.11ac; and may also be applied to a next-generation Wi-Fi system, a next-generation wireless local area network system, and the like.

Correspondingly, a reuse transmission device may be a user station (STA) in a WLAN. The user station may also be referred to as a system, a user unit, an access terminal, a mobile station, a remote station, a remote terminal, a mobile device, a user terminal, a terminal, a wireless communications device, a user agent, a user apparatus, or user equipment (UE). The STA may be a cellular phone, a cordless telephone set, a Session Initiation Protocol (SIP) phone, a wireless local loop (WLL) station, a personal digital assistant (PDA), a handheld device that has a wireless local area network (for example, Wi-Fi) communication function, a computing device, or another processing device connected to a wireless modem.

In addition, the reuse transmission device may be an AP in a WLAN. The AP may be configured to: communicate with UE by using the wireless local area network; and transmit data of the UE to a network side, or transmit data from a network side to the UE.

For ease of understanding and description, as an example instead of a limitation, the following describes an execution process and an execution action, in a WLAN system, of the data transmission method and apparatus in the present invention.

FIG. 1 is a schematic diagram of an application scenario of an embodiment of the present invention. As shown in FIG. 1, when a STA 1 and a STA 2 send uplink data to an access point AP 1 (a link between the AP 1 and the STA 1 and a link between the AP 1 and the STA 2 are collectively referred to as a primary link below), a STA 5 transmits data to an access point AP 2 by using all or some of time-frequency resources of the primary link (a link between the AP 2 and the STA 5 is referred to as a spatial reuse link below). Orthogonal frequency division multiple access (English: Orthogonal Frequency Division Multiple Access, OFDMA for short) is introduced into the 11ax standard. Therefore, when the primary link is a downlink, a receiving station may be multiple stations in a basic service set (English: Basic Service Set, BSS for short) of the primary link. Because locations of the multiple stations are unknown to a station of the spatial reuse link, if some stations are relatively close to the station of the spatial reuse link, mutual interference between links increases. To ensure that transmission quality of the primary link is not affected, interference caused by the spatial reuse link to the receiving station of the primary link cannot exceed maximum interference that the primary link can bear.

It should be understood that, when the primary link is an uplink, a receiving station can only be the AP 1 regardless of a quantity of stations scheduled by the AP 1 this time. In this case, the spatial reuse link can cause interference to only the AP 1. Therefore, this scenario is more suitable for spatial reuse transmission. However, the data transmission method in the embodiments of the present invention is also applicable to the scenario in which the primary link is a downlink.

It should be understood that only the application scenario in FIG. 1 is used as an example for describing the embodiments of the present invention. However, the embodiments of the present invention are not limited thereto. For example, a basic service set BSS 2 to which the AP 2 belongs may include more stations, and a BSS 1 may include only one station. For another example, in addition to a BSS 1, the primary link in the communications system may further include more BSSs. For still another example, the spatial reuse link is not limited to being used for uplink transmission, and may be further used for downlink transmission.

It should be further understood that, in the prior art, a path between two communications nodes is referred to as a link. In the embodiments of the present invention, links that are being used for uplink transmission are collectively referred to as a primary link. Therefore, there may be one primary link, or may be multiple primary links. Correspondingly, links for performing spatial reuse transmission with the primary link are collectively referred to as a spatial reuse link. Therefore, there may be one spatial reuse link, or may be multiple spatial reuse links.

It should be further understood that, in the embodiments of the present invention, for ease of description, an access point and a station of the primary link are respectively referred to as a primary access point and a primary station. In addition, in the embodiments of the present invention, the spatial reuse link may be an uplink, or may be a downlink. That is, both an access point and a station of the spatial reuse link can use the spatial reuse link to transmit data. Therefore, in the embodiments of the present invention, the access point and the station of the spatial reuse link are collectively referred to as a reuse transmission device.

With reference to FIG. 2 to FIG. 7, the following uses a case in which the primary link is an uplink as an example instead of a limitation, to describe in detail the data transmission method in the embodiments of the present invention.

FIG. 2 is a schematic flowchart of a data transmission method 100 described from a perspective of a primary access point in an embodiment of the present invention. As shown in FIG. 2, the method 100 includes the following steps:

S110. The primary access point performs determining processing according to a determining parameter, where the determining processing is used to determine whether a reuse transmission device of a spatial reuse link is allowed to use all or some of time-frequency resources of a primary link to transmit data.

S120. The primary access point generates spatial reuse transmission signaling according to a determining result obtained after the determining processing.

S130. The primary access point sends the spatial reuse transmission signaling, so that the reuse transmission device performs, according to the spatial reuse transmission signaling, data transmission processing based on the spatial reuse link.

In this embodiment of the present invention, the primary access point first performs determining processing according to the determining parameter, to determine whether the reuse transmission device of the spatial reuse link can be allowed to use all or some of the time-frequency resources of the primary link to transmit data, and whether interference caused by data transmission on the spatial reuse link to a process in which the primary access point receives uplink data falls within an allowed range. Then, the primary access point generates, according to the determining result obtained after the determining processing, the spatial reuse transmission signaling corresponding to the determining result. Finally, the primary access point sends the spatial reuse transmission signaling, so that after obtaining the spatial reuse transmission signaling, the reuse transmission device performs data transmission processing based on the spatial reuse link, to avoid interference caused to data transmission on the primary link.

Specifically, that the primary access point performs determining processing according to the determining parameter in S110 may be: The primary access point directly performs determining according to historical information (that is, Manner 1); or may be: The primary access point determines the determining parameter according to information related to the primary link, and then performs determining processing according to the determined determining parameter (that is, Manner 2).

Manner 1

The primary access point collects statistics about interference power by using which transmission of a surrounding BSS causes interference to the primary access point and that is obtained by means of listening in a time period (for example, T seconds before a current time); and then compares, with a threshold (or a range), a maximum interference power value (or an average interference power value, or an interference power value that occurs at a probability lower than a specific probability) that is obtained after the statistics collection. If the maximum interference power value is greater than the threshold or falls beyond the range, reuse transmission is not allowed this time; otherwise, reuse transmission is allowed this time.

For ease of understanding, as an example instead of a limitation, an example in which the primary link has a 20 MHz transmission bandwidth is used for description. For example, the primary access point may collect statistics about interference power by using which transmission of the surrounding BSS causes interference to the primary access point and that is obtained by means of listening on the 20 MHz transmission bandwidth in a time period (for example, T seconds before a current time); and then compare, with a threshold (or a range), a maximum interference power value (or an average interference power value, or an interference power value that occurs at a probability lower than a specific probability) that is obtained after the statistics collection. If the maximum interference power value is greater than the threshold or falls beyond the range, reuse transmission is not allowed for this time of data transmission; otherwise, reuse transmission is allowed for this time of data transmission.

Manner 2

The primary access point determines the determining parameter according to a transmission parameter used when the primary station for this time of uplink transmission sends an uplink data frame, and then performs determining processing according to the determining parameter.

In Manner 2, because the primary station is scheduled by the primary access point, the primary access point can obtain a related parameter used when the primary station sends an uplink data frame. For example, the primary access point can obtain information of the primary station, such as transmit power, a transmission bandwidth used when the primary station sends the uplink data frame, and a modulation and coding scheme (English: Modulation and Coding Scheme, MCS for short). The primary access point may obtain, by means of calculation according to these transmission parameters, maximum interference power that is allowed when the primary access point receives the uplink data frame sent by the primary station, and use the maximum interference power as the determining parameter for determining processing, to determine whether reuse transmission of the reuse transmission device can be allowed. For example, when the maximum interference power is greater than a preset threshold, the reuse transmission is allowed; or when the maximum interference power is less than a preset threshold, the reuse transmission is prohibited.

For example, the primary access point may determine, according to a transmission parameter used by the primary station that is scheduled to send an uplink data frame on a 20 MHz transmission bandwidth, maximum interference power that is allowed when the primary access point receives, on the 20 MHz bandwidth, the uplink data frame sent by the primary station. As shown in FIG. 3, on the primary link, a primary access point AP 1 schedules primary stations, that is, a STA 1, a STA 6, a STA 7, and a STA 8, to perform uplink transmission. The station STA 1 uses a transmission bandwidth of $BW_{STAk1}$, the station STA 7 uses a transmission bandwidth of $BW_{STAk7}$, and the station STA 6 and the station STA 8 use a same transmission bandwidth of $BW_{STAk6}/BW_{STAk8}$. In this case, the primary access point AP 1 may calculate maximum interference power based on the 20 MHz and according to the transmission parameters used by the primary stations, that is, the STA 1, the STA 6, the STA 7, and the STA 8.

In addition, the primary access point may further directly perform determining processing according to the MCS used by the primary station.

For example, if an index of the MCS used by the primary station is greater than or equal to 5, reuse transmission of the reuse transmission device is allowed; or if an index of the MCS used by the primary station is less than 5, reuse transmission of the reuse transmission device is prohibited.

It should be understood that only the example in which the index of the MCS is 5 is used for description. This embodiment of the present invention is not limited thereto. For example, if the index of the MCS is greater than or equal to 3, reuse transmission is allowed; or if the index of the MCS is less than 3, reuse transmission is prohibited. In addition, the index of the MCS may be further compared with a preset threshold.

Optionally, that the primary access point performs determining processing according to the determining parameter includes:

performing, by the primary access point, determining processing according to N determining parameters, where the N determining parameters are in a one-to-one correspondence with N transmission sub-bandwidths of the primary link, each determining parameter is used to determine whether the reuse transmission device is allowed to use a corresponding transmission sub-bandwidth, and N≥2.

Correspondingly, in this case, the primary access point generates N pieces of spatial reuse transmission signaling. A specific process is described in detail in S120 in the following.

Specifically, when performing determining processing, the primary access point may perform determining processing according to an entire transmission bandwidth of the primary link; or may divide an entire transmission bandwidth into multiple transmission sub-bandwidths, and separately perform determining processing. For each transmission sub-bandwidth, the transmission sub-bandwidth may be further divided into smaller sub-bandwidths for determining processing. For ease of understanding, an example in which the primary link has a 40 MHz transmission bandwidth is used for description.

For example, the primary access point may divide the 40 MHz bandwidth into two 20 MHz sub-bandwidths. Then, the primary access point may collect statistics about interference power by using which transmission of a surrounding BSS causes interference to the primary access point and that is obtained by means of listening on each of the two 20 MHz sub-bandwidths in a time period (for example, T seconds before a current time); and then compare, with a threshold (or a range), a maximum interference power value (or an average interference power value, or an interference power value that occurs at a probability lower than a specific probability) that is obtained after the statistics collection on each 20 MHz sub-bandwidth, to separately determine whether reuse transmission of the reuse transmission device is allowed on the two 20 MHz sub-bandwidths.

Correspondingly, the reuse transmission device receives two pieces of spatial reuse transmission signaling. For example, a first piece of spatial reuse transmission signaling indicates that reuse transmission is prohibited on a first 20 MHz sub-bandwidth, and a second piece of spatial reuse transmission signaling indicates that reuse transmission is allowed on a second 20 MHz sub-bandwidth. If a bandwidth used by the reuse transmission device during reuse transmission is the first 20 MHz sub-bandwidth, the reuse transmission device cannot use this reuse transmission opportunity. However, if a bandwidth used by the reuse transmission device during reuse transmission is the second 20 MHz sub-bandwidth or a part of the second 20 MHz sub-bandwidth, the reuse transmission device can use this reuse transmission opportunity.

Figure 4:
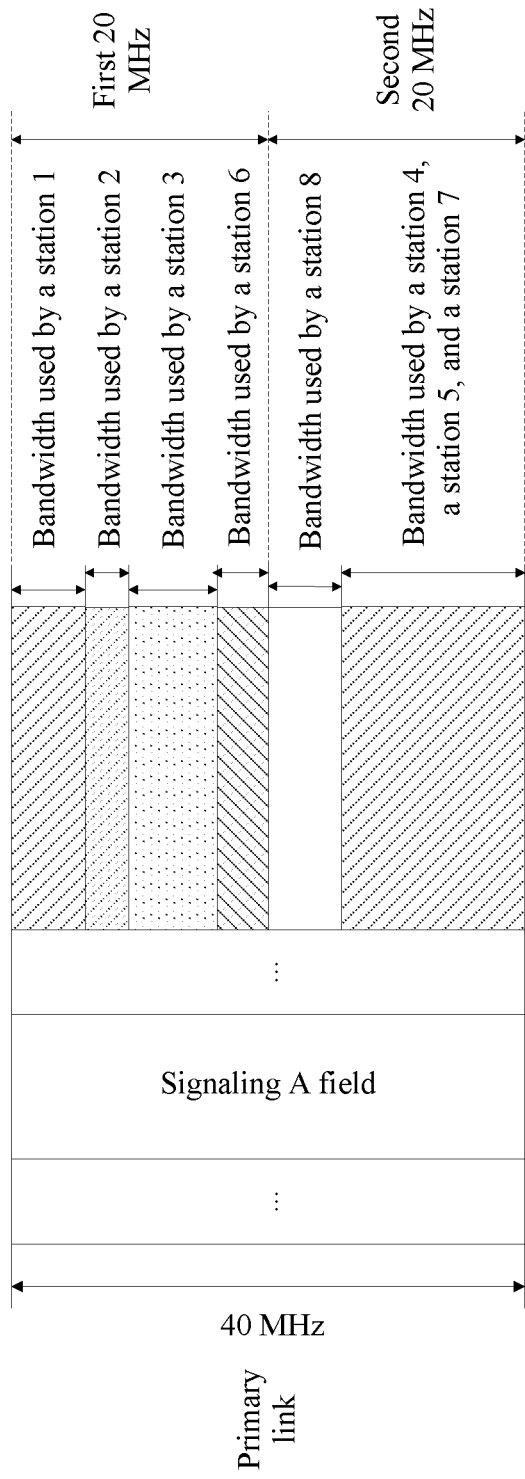
FIG. 4 is a schematic diagram of bandwidth allocation according to another embodiment of the present invention.

For another example, the primary access point first determines the N determining parameters, and then performs determining processing according to the N determining parameters. For example, as shown in FIG. 4, the primary access point first divides the 40 MHz transmission bandwidth into two 20 MHz sub-bandwidths, and then the primary access point calculates a determining parameter on each of the two 20 MHz bandwidth sub-bandwidths. When calculating a determining parameter on a first 20 MHz bandwidth, the primary access point determines the determining parameter on the first 20 MHz based on the first 20 MHz sub-bandwidth and according to uplink transmission parameters of a primary station 1, a primary station 2, a primary station 3 and a primary station 6 that send uplink data on the first 20 MHz bandwidth. When calculating a determining parameter on a second 20 MHz bandwidth, the primary access point determines the determining parameter on the second 20 MHz bandwidth based on the second 20 MHz sub-bandwidth and according to transmission parameters used by a primary station 4, a primary station 5, a primary station 7, and a primary station 8 that send uplink data on the second 20 MHz bandwidth. Then, the primary access point separately performs determining processing according to the determining parameter obtained by means of calculation on the first 20 MHz bandwidth and that obtained by means of calculation on the second 20 MHz bandwidth.

For another example, the primary access point may divide the 40 MHz bandwidth into two 20 MHz sub-bandwidths; and then perform determining processing on a first 20 MHz sub-bandwidth according to historical information, to determine whether reuse transmission of the reuse transmission device is allowed on the first 20 MHz sub-bandwidth. For a second 20 MHz sub-bandwidth, the primary access point first determines a determining parameter on the second 20 MHz sub-bandwidth according to a transmission parameter of a primary station that sends uplink data on the second 20 MHz sub-bandwidth, and then performs determining processing according to the determining parameter, to determine whether reuse transmission is allowed on the second 20 MHz sub-bandwidth.

In addition, the primary access point may further separately calculate the determining parameter according to an actual occupied bandwidth allocated to the primary station.

For example, on a first 20 MHz sub-bandwidth, a 7 MHz transmission bandwidth is allocated to a station 1, a 5 MHz transmission bandwidth is allocated to a station 2, and a 7.5 MHz transmission bandwidth is allocated to a station 3. In this case, the primary access point may determine a determining parameter on a corresponding bandwidth according to each of the 7 MHz bandwidth, the 5 MHz bandwidth, and the 7.5 MHz bandwidth.

It should be understood that, in this embodiment of the present invention, only the example in which the primary link has the 40 MHz transmission bandwidth is used for description. The present invention is not limited thereto. The primary link may have a greater transmission bandwidth, for example, 80 MHz bandwidth or 160 MHz bandwidth. A determining parameter determining method used when the primary link has the greater transmission bandwidth is similar to that used when the primary link has the 40 MHz transmission bandwidth. For brevity, details are not described herein again.

Likewise, in this embodiment of the present invention, only the example in which the primary link has the 20 MHz sub-bandwidth is used for description. The present invention is not limited thereto. For example, when the primary link has a 20 MHz transmission bandwidth, the primary link may have a 10 MHz sub-bandwidth. For another example, when the primary link has an 80 MHz transmission bandwidth, the primary link may have a 40 MHz sub-bandwidth.

Correspondingly, the reuse transmission device receives multiple pieces of spatial reuse transmission signaling. In this case, the reuse transmission device needs to perform data transmission processing according to spatial reuse transmission signaling corresponding to a transmission bandwidth of the reuse transmission device. For example, reuse transmission is allowed on a first 20 MHz sub-bandwidth of the primary link, and reuse transmission is prohibited on a second 20 MHz sub-bandwidth of the primary link. If 20 MHz bandwidth corresponding to the transmission bandwidth used by the reuse transmission device is the second 20 MHz sub-bandwidth of the primary link, the reuse transmission device cannot use the second 20 MHz sub-bandwidth to transmit data; or if 20 MHz bandwidth corresponding to the transmission bandwidth used by the reuse transmission device is the first 20 MHz sub-bandwidth of the primary link, the reuse transmission device can perform reuse transmission. For another example, the transmission bandwidth used by the reuse transmission device is corresponding to a second 20 MHz sub-bandwidth of the primary link; and received spatial reuse transmission signaling corresponding to the second 20 MHz sub-bandwidth not only indicates that reuse transmission of the reuse transmission device is allowed, but also indicates the maximum interference power that can be allowed on the primary link. In this case, if the reuse transmission device is to perform reuse transmission, the reuse transmission device needs to calculate, according to the maximum interference power, maximum transmit power that the reuse transmission device can use during the reuse transmission. Further, transmit power used during data transmission should not exceed the maximum transmit power, to reduce possible interference caused to the primary link.

Therefore, according to the data transmission method in this embodiment of the present invention, mutual interference between the primary link and the spatial reuse link during data transmission can be reduced, and transmission quality can be improved.

Optionally, the determining parameter is the maximum interference power that is allowed when the primary access point receives the uplink data frame sent by the primary station.

That is, when performing determining processing, the primary access point may use, as the determining parameter, the maximum interference power that can be allowed when the primary station sends the uplink data frame.

Optionally, when a communications system includes at least two primary stations, that the primary access point determines the determining parameter according to the transmission parameter used by the primary station includes:

determining, by the primary access point according to uplink transmission parameters used by all of the at least two primary stations, maximum interference power densities that are allowed when the primary access point receives uplink data frames sent by all of the at least two primary stations;

determining, by the primary access point, a minimum value from the maximum interference power densities; and determining, by the primary access point, the maximum interference power according to the minimum value.

Specifically, when there are multiple primary stations in the communications system, the primary access point may calculate, according to an uplink transmission parameter of each station, a maximum interference power density that is allowed when the primary access point receives an uplink data frame sent by the station. In this way, there are multiple maximum interference power densities. In order that the primary access point can effectively receive uplink data frames sent by the multiple primary stations, the following condition should be met: When the primary access point receives an uplink data frame sent by each primary station, interference caused by the spatial reuse link should not exceed an interference limit that the primary access point can bear. Therefore, the primary access point needs to select a minimum value from the multiple maximum interference densities, and determines the maximum interference power according to the minimum value.

Optionally, that the primary access point determines, according to the transmission parameters used by all of the at least two primary stations, the maximum interference power densities that are allowed when the primary access point receives the uplink data frames sent by all of the at least two primary stations includes:

determining, by the primary access point according to a formula $$isd_{STAk} = \frac{(P_{STAk}^{Tx}/L_{STAk})}{SINR_{STAk}^{required}} \cdot \frac{1}{BW_{STAk}},$$

a maximum interference power density that is allowed when the primary access point receives an uplink data frame sent by a station k in the at least two primary stations, where $isd_{STAk}$ indicates the maximum interference power density that is allowed when the primary access point receives the uplink data frame sent by the station k, $P_{STAk}^{Tx}$ indicates transmit power used by the station k to send the uplink data frame, $SINR_{STAk}^{required}$ indicates a minimum signal to interference plus noise ratio that is required when the primary access point receives the uplink data frame sent by the station k, and $BW_{STAk}$ indicates a transmission bandwidth used when the station k sends the uplink data frame.

It should be noted that, in this embodiment of the present invention, the primary station is a station that is scheduled by the primary access point to send an uplink data frame. For example, in FIG. 3, the station k may be the station 1, the station 6, the station 7, or the station 8. In FIG. 4, the station k on the first 20 MHz sub-bandwidth may be the station 1, the station 2, the station 3, or the station 6; the station k on the second 20 MHz sub-bandwidth may be the station 4, the station 5, the station 7, or the station 8.

The transmit power of the primary station is divided by a loss during transmission between the primary station and the AP 1, to obtain receive power of the AP 1. The receive power is divided by the required minimum SINR, to obtain the maximum interference power that is allowed when the AP 1 receives the data frame sent by the primary station. Then, the maximum interference power is divided by the transmission bandwidth used by the primary station, to obtain a maximum interference power density that is allowed when the AP 1 receives the data frame sent by the primary station.

It should be understood that, because the primary station is scheduled by the AP 1, the AP 1 learns the transmit power, the allocated transmission bandwidth, the MCS, and like information of the primary station. The minimum SINR required for receiving the data frame can be obtained by using the allocated transmission bandwidth. In addition, the AP 1 may obtain the loss during transmission from the primary station to the AP 1 according to historical information. For example, when sending an uplink request frame by means of random access, the primary station usually sends the uplink request frame by using maximum transmit power specified in a standard. In this way, the AP 1 can calculate the transmission loss according to the specified maximum transmit power and receive power by using which the AP 1 receives the uplink request frame.

Optionally, that the primary access point determines the maximum interference power according to the minimum value includes:

determining the maximum interference power on a transmission bandwidth of the primary link according to a formula $$I_{max\_level} = \min_{STAk}\{isd_{STAk}\} \cdot BW_{total}/\text{Redundancy};$$

or determining maximum interference power on an $m^{th}$ sub-bandwidth in the N transmission sub-bandwidths according to a formula $$I^m_{max\_level} = \min_{STAk \in \{m^{th}sub-band\}}\{isd_{STAk}\} \cdot BW^m/\text{Redundancy},$$

where $I_{max\_level}$ is the maximum interference power that is allowed when the primary access point AP 1 receives an uplink data frame sent by at least one uplink station, $$\min_{STAk}\{isd_{STAk}\}$$

indicates the minimum value determined by the primary access point from the maximum interference power densities, $BW_{total}$ indicates the transmission bandwidth of the primary link, Redundancy indicates a redundancy reserved in the system, $I_{max\_level}^m$ indicates the maximum interference power on the $m^{th}$ sub-bandwidth, and $BW^m$ indicates the $m^{th}$ sub-bandwidth in the N transmission sub-bandwidths.

It should be noted that the maximum interference power may be another logical variation thereof. For example, $T_{max\_level} = I_{max\_level} \cdot P_{AP1}^{Tx}$, where $P_{AP1}^{Tx}$ indicates transmit power of the primary access point AP 1.

That is, when determining the maximum interference power, the primary access point may perform calculation according to the total transmission bandwidth of the primary link, or may perform calculation based on a sub-bandwidth less than the total transmission bandwidth.

For example, if the primary link has a 40 MHz total transmission bandwidth, a spatial reuse transmission parameter is calculated on each of two 20 MHz sub-bandwidths. When the primary link has a greater transmission bandwidth, a spatial reuse transmission parameter may be calculated by using a method similar to this method. A minimum value is selected from at least one maximum interference power density that belongs to a first 20 MHz sub-bandwidth; the minimum value is multiplied by a bandwidth value (that is, 20 MHz bandwidth) of the first sub-bandwidth; then, a system redundancy coefficient is subtracted from a value obtained after the multiplication, to obtain maximum interference power that is allowed when the AP 1 receives an uplink data frame sent by at least one uplink station on the first basic sub-bandwidth. For example, in FIG. 4, when m=1, the station k may be the station 1, the station 2, the station 3, or the station 6; or when m=2, the station k may be the station 4, the station 5, the station 7, or the station 8.

It should be noted that the redundancy Redundancy of the system may also be referred to as a redundancy coefficient of the system. The redundancy may be a pre-agreed fixed value, or a value obtained by means of calculation according to a pre-agreed method. Alternatively, the redundancy may be 0.

The minimum value is selected from the maximum interference power density values obtained by means of calculation, and then the minimum value is multiplied by the total transmission bandwidth. For example, $BW_{total}=20$ MHz bandwidth when the primary link has a 20 MHz total transmission bandwidth. For another example, $BW_{total}=40$ MHz bandwidth when the primary link has a 40 MHz total transmission bandwidth. Then, a value obtained after the multiplication is divided by the redundancy reserved in the system, to obtain the maximum interference power that is allowed when the uplink data frame sent by the at least one uplink station is received.

It should be noted that when the maximum interference power is calculated according to the foregoing formula, if the calculation is performed in a unit of decibel, the formula may also be represented as $$I_{max\_level} = \min_{STAk}\{isd_{STAk}\} \cdot BW_{total} - \text{Redundancy}.$$

That is, the minimum interference power density value is multiplied by the total transmission bandwidth of the primary link, and then the redundancy reserved in the system is subtracted from a value obtained after the multiplication, to obtain the maximum interference power that is allowed when the uplink data frame sent by the at least one uplink station is received. Therefore, a variation in which a logical form of the calculation formula changes according to different units used during calculation shall fall within the protection scope of the embodiments of the present invention.

In S120, the primary access point generates the spatial reuse transmission signaling according to the determining result obtained after the determining processing.

Optionally, in this embodiment of the present invention, the spatial reuse transmission signaling includes first spatial reuse transmission signaling that is used to indicate that the reuse transmission device is prohibited from using all or some of the time-frequency resources of the primary link; or the spatial reuse transmission signaling includes second spatial reuse transmission signaling that is used to indicate that the reuse transmission device is allowed to use all or some of the time-frequency resources of the primary link.

Specifically, after the determining processing, the primary access point generates the spatial reuse transmission signaling corresponding to the determining result. For example, the primary access point may use 1 bit in the spatial reuse transmission signaling to indicate whether reuse transmission of the reuse transmission device is allowed or prohibited. Alternatively, the primary access point may use 4 bits to indicate the determining parameter. For example, according to a preset rule, "0000" is used to indicate an allowed maximum interference power of −80 dBm, "0001" is used to indicate an allowed maximum interference power of −75 dBm, and "1111" is used to indicate an allowed maximum interference power of −5 dBm. Alternatively, the primary access point may use 1 bit in the spatial reuse transmission signaling to indicate whether reuse transmission of the reuse transmission device the reuse transmission device is allowed, and further use 4 bits to indicate the determining parameter. Alternatively, the primary access point uses an all "0" combination of 4 bits to indicate that reuse transmission of the reuse transmission device is prohibited, and uses a remaining bit combination to indicate the determining parameter; or the primary access point uses an all "1" combination of 4 bits to indicate that reuse transmission of the reuse transmission device is allowed, and uses a remaining bit combination to indicate the determining parameter; or the primary access point uses an all "1" combination of 4 bits to indicate unconditional allowance, or uses an all "0" combination of 4 bits to indicate unconditional prohibition.

It should be noted that the unconditional allowance or the unconditional prohibition indicates that the primary access point has no requirement for transmit power of the reuse transmission device.

Optionally, that the primary access point generates the spatial reuse transmission signaling according to the determining result obtained after the determining processing includes:

performing, by the primary access point, determining processing according to the N determining parameters, and generating the N pieces of spatial reuse transmission signaling.

For example, as shown in FIG. 4, the primary access point first divides the 40 MHz transmission bandwidth into the two 20 MHz sub-bandwidths, and then the primary access point separately calculates the determining parameter on the first 20 MHz sub-bandwidth, and the determining parameter on the second 20 MHz sub-bandwidth. Then, the primary access point separately performs determining processing according to the determining parameter obtained by means of calculation on the first 20 MHz bandwidth and that obtained by means of calculation on the second 20 MHz bandwidth. That is, one piece of spatial reuse transmission signaling is generated on each 20 MHz sub-bandwidth.

For another example, the primary access point may perform determining processing on the first 20 MHz sub-bandwidth according to the historical information, to generate spatial reuse transmission signaling on the first 20 MHz sub-bandwidth; and then the primary access point first determines the determining parameter on the second 20 MHz sub-bandwidth according to the transmission parameter used by the primary station, and then generates spatial reuse transmission signaling on the second 20 MHz sub-bandwidth according to the determined determining parameter.

In this case, two pieces of spatial reuse transmission signaling are generated. Therefore, 8 bits may be used to indicate the spatial reuse transmission signaling. For example, b0 to b3 are used to indicate the spatial reuse transmission signaling on the first sub-bandwidth, and b4 to b7 are used to indicate the spatial reuse transmission signaling on the second sub-bandwidth.

For still another example, the primary access point may further perform determining processing on both the first 20 MHz sub-bandwidth and the second 20 MHz sub-bandwidth according to the historical information. In this case, one piece of spatial reuse transmission signaling is generated on each 20 MHz sub-bandwidth. In this case, the primary access point may use 2 bits to indicate whether reuse transmission of the reuse transmission device is allowed on each of the two 20 MHz sub-bandwidths.

Therefore, according to the data transmission method in this embodiment of the present invention, the primary access point may generate the spatial reuse transmission signaling according to the transmission bandwidth of the primary link, or may generate the spatial reuse transmission signaling based on the sub-bandwidth that is less than the transmission bandwidth of the primary link. Further, the reuse transmission device may perform, according to the received spatial reuse transmission signaling and with reference to a correspondence between the transmission bandwidth of the primary link and the transmission bandwidth used by the reuse transmission device during reuse transmission, processing on whether to use all or some of the time-frequency resources of the primary link to transmit data. Therefore, interference caused by the reuse transmission to the primary link can be reduced, and transmission quality can be improved.

Optionally, when the determining result obtained after the determining processing is that the reuse transmission device is allowed to use all or some of the time-frequency resources of the primary link to transmit data, the spatial reuse transmission signaling includes power indication information. The power indication information is used by the reuse transmission device to determine the maximum transmit power that can be used when the reuse transmission device uses all or some of the time-frequency resources of the primary link to transmit data.

It should be understood that the power indication information may be the maximum interference power that is allowed when the primary access point receives the uplink data frame sent by the primary station; or may be another parameter, for example, may be another logical variation of the maximum interference power.

Specifically, the primary access point generates the spatial reuse transmission signaling after the determining processing. The spatial reuse transmission signaling may indicate whether the reuse transmission device can use all or some of the time-frequency resources of the primary link to transmit data. In addition, the power indication information may be further added to the spatial reuse transmission signaling. Therefore, after receiving the spatial reuse transmission signaling, the reuse transmission device can not only learn whether reuse transmission can be performed, but also learn the maximum transmit power that can be used. In this way, no interference is caused to data transmission on the primary link. For example, the primary access point may use 1 bit to indicate that reuse transmission of the reuse transmission device is allowed, and further use 4 bits to indicate the maximum interference power; or the primary access point may use a group of special values of 4 bits to indicate whether reuse transmission is allowed or prohibited, and use a remaining group of values of 4 bits to indicate the maximum interference power.

Correspondingly, after receiving the power indication information, the reuse transmission device may determine the maximum transmit power that can be used during reuse transmission, and transmit data by using power that is not greater than the maximum transmit power, to reduce interference between the primary link and the spatial reuse link.

Therefore, according to the data transmission method in this embodiment of the present invention, mutual interference between the primary link and the spatial reuse link during data transmission can be reduced, and transmission quality can be improved.

In S130, the primary access point sends the spatial reuse transmission signaling, so that the reuse transmission device performs, according to the spatial reuse transmission signaling, data transmission processing based on the spatial reuse link.

Optionally, the primary access point sends the spatial reuse transmission signaling to the primary station, so that the primary station adds the spatial reuse transmission signaling to an uplink data frame when sending the uplink data frame, and the reuse transmission device obtains the spatial reuse transmission signaling from the uplink data frame.

Specifically, the primary access point sends a trigger frame to the primary station, so as to schedule the primary station to send uplink data. A signaling A field or load information of the trigger frame carries the spatial reuse transmission signaling.

Correspondingly, the primary station receives the spatial reuse transmission signaling sent by the primary access point, and adds the spatial reuse transmission signaling to the subsequently sent uplink data frame, so that the reuse transmission device of the spatial reuse link obtains the spatial reuse transmission signaling from the uplink data frame, and performs, according to the spatial reuse transmission signaling, data transmission processing based on the spatial reuse link.

That is, the reuse transmission device receives the spatial reuse transmission parameter. The spatial reuse transmission parameter may be obtained from the trigger frame that is sent by the primary access point to the primary station, or may be obtained from the uplink data frame that is sent by the primary station to the primary access point. Then, the reuse transmission device may perform, according to the spatial reuse transmission signaling, data transmission processing based on the spatial reuse link.

For example, when the reuse transmission device receives spatial reuse transmission signaling A (that is, an example of the first spatial reuse transmission signaling) that is used to prohibit the reuse transmission device from using all or some of the time-frequency domain resources of the primary link to transmit data, the reuse transmission device cannot use all or some of the time-frequency resources of the primary link to transmit data, according to the spatial reuse transmission signaling. For another example, when the reuse transmission device receives spatial reuse transmission signaling B (that is, an example of the second spatial reuse transmission signaling) that is used to allow the reuse transmission device to use all or some of the time-frequency domain resources of the primary link to transmit data, the reuse transmission device can transmit data according to the spatial reuse transmission signaling B. Obviously, even if the reuse transmission device receives the spatial reuse transmission signaling for allowing reuse transmission, the reuse transmission device may choose, with reference to other information about the link, to give up this reuse transmission opportunity; and so on.

It should be understood that, if the primary access point sends multiple pieces of spatial reuse transmission signaling, the primary station correspondingly receives the multiple pieces of spatial reuse transmission signaling, and the primary station correspondingly needs to add the multiple pieces of spatial reuse transmission signaling when adding the spatial reuse transmission signaling to the uplink data frame. A specific adding manner is shown in FIG. 6A and FIG. 6B in FIG. 6. For example, as shown in FIG. 6A, the primary link has a 20 MHz basic bandwidth, and a SIGA field on each 20 MHz bandwidth carries corresponding spatial reuse transmission signaling, that is, SIGA fields on 20 MHz bandwidths may carry different spatial reuse transmission signaling. For another example, as shown in FIG. 6B, the primary link has a 20 MHz basic sub-bandwidth, and a SIGA field on each 20 MHz bandwidth carries all pieces of spatial reuse transmission signaling, that is, SIGA fields on 20 MHz bandwidths may carry same spatial reuse transmission signaling.

It should be understood that, if the reuse transmission device receives the N pieces of spatial reuse transmission signaling, the reuse transmission device needs to perform, according to the N pieces of spatial reuse transmission signaling, data transmission processing based on the spatial reuse link.

Specifically, the reuse transmission device chooses, from the N pieces of spatial reuse transmission signaling, a spatial reuse transmission parameter corresponding to the transmission bandwidth of the reuse transmission device, to perform data transmission processing.

For example, if 20 MHz bandwidth corresponding to the transmission bandwidth used during spatial reuse transmission is a second 20 MHz transmission sub-bandwidth of the primary link, a spatial reuse transmission parameter corresponding to bits b4 to b7 is selected, to obtain corresponding allowed maximum interference power. For another example, the reuse transmission device receives two pieces of spatial reuse transmission signaling. Reuse transmission is prohibited on a first 20 MHz transmission sub-bandwidth, and reuse transmission is allowed on a second 20 MHz transmission sub-bandwidth. If the transmission bandwidth used by the reuse transmission device is corresponding to the second 20 MHz sub-bandwidth of the primary link, the reuse transmission device may use the second 20 MHz sub-bandwidth to transmit data. If the transmission bandwidth used by the reuse transmission device is corresponding to the first 20 MHz transmission sub-bandwidth of the primary link, the reuse transmission device can only give up this reuse transmission opportunity.

When determining the maximum transmit power that can be used during reuse transmission, the reuse transmission device may determine the maximum transmit power according to a formula $P_{SR\_max}^{Tx} = \tilde{I}_{max\_level} \cdot L_{SR}$, where $P_{SR\_max}^{Tx}$ indicates the maximum transmit power, $\tilde{I}_{max\_level}$ indicates the maximum interference power, and $L_{SR}$ indicates a loss during transmission from the reuse transmission device to the primary access point.

It should be noted that, if the transmission bandwidth used by the reuse transmission device is not a 20 MHz bandwidth but an occupied sub-channel in the 20 MHz bandwidth, for example, the reuse transmission device is an uplink station scheduled by an AP 2, and the AP 2 allocates a transmission bandwidth of $BW_{SR}$ less than 20 MHz bandwidth to the reuse transmission device, a stricter manner for calculating the maximum transmit power is as follows:

$$P_{SR\_max}^{Tx} = \tilde{I}_{max\_level} \cdot L_{SR} \cdot \frac{BW_{SR}}{BW_{total}},$$

where $BW_{SR}$ is the bandwidth used by the reuse transmission device, and $BW_{total}$ is a bandwidth value of the total transmission bandwidth or a sub-bandwidth of the primary link to which the bandwidth used by the reuse transmission device belongs.

Correspondingly, if the bandwidth used by the reuse transmission device during reuse transmission is greater than the sub-bandwidth of the primary link, the reuse transmission device needs to select a minimum value from maximum interference power values corresponding to a sub-bandwidth set that is of the primary link and that is included in the transmission bandwidth used by the reuse transmission device, to determine the maximum transmit power that can be used by the reuse transmission device during reuse transmission.

For example, if the reuse transmission device uses a 40 MHz transmission bandwidth, and the primary link has a 20 MHz sub-bandwidth, a 10 MHz sub-bandwidth, and a 10 MHz sub-bandwidth, the reuse transmission device needs to select a minimum value from maximum interference power values corresponding to a basic sub-bandwidth set including the 20 MHz bandwidth, 10 MHz bandwidth, and 10 MHz bandwidth, to calculate the maximum transmit power that can be used during reuse transmission.

It should be understood that, in this embodiment of the present invention, if the reuse transmission device uses all or some of the time-frequency resources of the primary link to transmit data, the reuse transmission device may generate spatial reuse transmission signaling C (that is, an example of fourth spatial reuse transmission signaling). The spatial reuse transmission signaling C is used to prohibit a third-party device in the communications system from using this reuse transmission opportunity when the third-party device receives the spatial reuse transmission signaling C. Specifically, in a data transmission process, the reuse transmission device does not want a third-party device to use this reuse transmission opportunity. Therefore, the reuse transmission device adds the fourth spatial reuse transmission signaling to a data frame sent during reuse transmission. In this case, if there is a third-party device in the communications system, and the third-party device is relatively close to both the primary access point and the reuse transmission device, the third-party device may not only obtain the spatial reuse transmission signaling of the primary access point by means of listening, but also obtain, by means of listening, the fourth spatial reuse transmission signaling sent by the reuse transmission device. In this case, even though the third-party device obtains, by means of listening, the signaling for allowing reuse transmission on the primary link, because the fourth spatial reuse transmission signaling prohibits the third-party device from performing reuse transmission at a same time with the reuse transmission device, the third-party device cannot use this reuse transmission opportunity.

It should be noted that, in this embodiment, because the reuse transmission device does not want to perform reuse transmission at a same time with the third-party device, the reuse transmission device may directly generate the fourth spatial reuse transmission signaling without performing any determining processing.

In addition, the reuse transmission device may perform determining processing according to a second determining parameter, and then generate the fourth spatial reuse transmission signaling according to a determining result obtained after the determining processing.

It should be understood that the second determining parameter is a parameter related to the spatial reuse link. The reuse transmission device may perform, according to the second determining parameter, determining processing on whether a third-party device is allowed to perform reuse transmission on the spatial reuse link, and correspondingly, generate the spatial reuse transmission signaling (that is, the fourth spatial reuse transmission signaling) of the spatial reuse link.

It should be further understood that a process in which the reuse transmission device performs determining processing according to the second determining parameter and generates the fourth spatial reuse transmission signaling according to the determining result is similar to the method in which the primary access point performs determining processing and generates the spatial reuse transmission signaling. For brevity, details are not described herein again.

That is, in this embodiment of the present invention, the fourth spatial reuse transmission signaling is used to prohibit reuse transmission of the third-party device. However, obviously, the fourth spatial reuse transmission signaling may further indicate that reuse transmission of the third-party device is allowed. When indicating that reuse transmission is allowed, the fourth spatial reuse transmission signaling may further indicate the second determining parameter or maximum transmit power that can be used by the third-party device. That is, a function that the reuse transmission device generates the spatial reuse transmission signaling (that is, an example of the fourth spatial reuse transmission signaling) of the spatial reuse link is similar to a function that the primary access point generates the spatial reuse transmission signaling of the primary link, and generation processes and methods are also similar. For brevity, details are not described herein again.

It should be understood that the reuse transmission device and the primary access point in this embodiment of the present invention may belong to different BSSs, or may belong to a same BSS. The data transmission method in this embodiment of the present invention is described in a case in which the reuse transmission device and the primary access point belong to different BSSs. The following describes a case in which the reuse transmission device and the primary access point belong to a same BSS.

When the primary access point and the reuse transmission device belong to a same BSS, the primary link is used for uplink multiuser UL MU transmission in the BSS, and the spatial reuse link is used for D2D transmission in the same BSS. In this case, the reuse transmission device may also be referred to as a D2D transmission station, and SR transmission is D2D transmission.

Specifically, the D2D transmission station receives a trigger frame or an uplink data frame, and determines whether the trigger frame or the uplink data frame is a transmission frame of the BSS. If the trigger frame or the uplink data frame is the transmission frame of the BSS, maximum transmit power allowed during D2D transmission is calculated according to spatial reuse transmission signaling carried in the trigger frame or the uplink data frame. If the trigger frame or the uplink data frame is not the transmission frame of the BSS, maximum transmit power allowed during D2D transmission may be calculated according to an existing standard procedure, or may be calculated according to the procedure in the foregoing embodiment. This is not limited in the present invention.

In addition, the D2D transmission station may use 1-bit indication information in a SIGA field in a preamble of a transmission frame to indicate whether current transmission is D2D transmission. For example, "1" indicates that the transmission frame is a D2D data frame, and "0" indicates that the transmission frame is a common data frame. After another D2D transmission station in the BSS receives the trigger frame of the BSS, the another D2D transmission station calculates, according to the foregoing procedure, maximum transmit power allowed during D2D transmission, and Clear Channel Assessment (CCA) detection is subsequently performed. It is assumed that the CCA detection succeeds, and the another D2D transmission station further receives a data frame of the BSS in a random backoff process. In this case, if the another D2D transmission station determines that 1-bit indication information in the data frame is "1", the another D2D transmission station gives up this reuse transmission opportunity before transmission of the D2D data frame ends; or if the another D2D transmission station determines that 1-bit indication information is "0", the another D2D transmission station continues to perform a reuse procedure.

Therefore, according to the data transmission method in this embodiment of the present invention, the primary access point determines, according to the determining parameter, whether the reuse transmission device of the spatial reuse link is allowed to use all or some of the time-frequency resources of the primary link to transmit data; and generates the spatial reuse transmission signaling corresponding to the determining result obtained after the determining processing, so that after obtaining the spatial reuse transmission signaling, the reuse transmission device performs data transmission processing based on the spatial reuse link. Therefore, interference between the primary link and the spatial reuse link can be reduced, and transmission quality can be improved.

With reference to FIG. 2 to FIG. 4, the foregoing describes the data transmission method in the embodiments of the present invention from a perspective of the primary access point. With reference to FIG. 5 and FIG. 6, the following describes the data transmission method in the embodiments of the present invention from a perspective of the primary station.

FIG. 5 is a schematic flowchart of a data transmission method 200 described from a perspective of a primary station in an embodiment of the present invention. As shown in FIG. 5, the method 200 includes the following steps:

S210. The primary station receives spatial reuse transmission signaling sent by a primary access point, where the spatial reuse transmission signaling is used by a reuse transmission device of a spatial reuse link to determine whether to use all or some of time-frequency resources of a primary link to perform data transmission processing based on the spatial reuse link.

S220. The primary station sends an uplink data frame to the primary access point, where the uplink data frame carries the spatial reuse transmission signaling.

Specifically, the primary station receives the spatial reuse transmission signaling sent by the primary access point, and adds the spatial reuse transmission signaling to the subsequently sent uplink data frame. The spatial reuse transmission signaling is corresponding to a determining result. The determining result is obtained after the primary access point performs determining processing according to a determining parameter. The determining processing is used to determine whether the reuse transmission device of the spatial reuse link is allowed to use all or some of the time-frequency resources of the primary link to transmit data.

Optionally, the spatial reuse transmission signaling may be in a signaling A field in a preamble of the uplink data frame.

Optionally, the spatial reuse transmission signaling includes first spatial reuse transmission signaling that is used to indicate that the reuse transmission device is prohibited from using all or some of the time-frequency resources of the primary link; or the spatial reuse transmission signaling includes second spatial reuse transmission signaling that is used to indicate that the reuse transmission device is allowed to use all or some of the time-frequency resources of the primary link.

Optionally, there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and N≥2.

That the primary station sends the uplink data frame to the primary access point, where the uplink data frame carries the spatial reuse transmission signaling includes:

adding, by the primary station, the N pieces of spatial reuse transmission signaling to a signaling A field of an uplink data frame on each of the N transmission sub-bandwidths, where N≥2; or adding, to a signaling A field of an uplink data frame on an $m^{th}$ transmission sub-bandwidth in the N transmission sub-bandwidths, an $m^{th}$ piece of spatial reuse transmission signaling corresponding to the $m^{th}$ transmission sub-bandwidth, where m≥1.

Specifically, because the primary station receives multiple pieces of spatial reuse transmission signaling, the primary station adds the multiple pieces of spatial reuse transmission signaling to the signaling A field in the preamble of the sent uplink data frame. A specific adding manner is shown in FIG. 6A and FIG. 6B in FIG. 6. For example, as shown in FIG. 6A, the primary link has a 20 MHz basic bandwidth, and a SIGA field on each 20 MHz bandwidth carries corresponding spatial reuse transmission signaling, that is, SIGA fields on 20 MHz bandwidths may carry different spatial reuse transmission signaling. For another example, as shown in FIG. 6B, the primary link has a 20 MHz basic sub-bandwidth, and a SIGA field on each 20 MHz bandwidth carries all pieces of spatial reuse transmission signaling, that is, SIGA fields on 20 MHz bandwidths may carry same spatial reuse transmission signaling.

Correspondingly, when receiving the multiple pieces of spatial reuse transmission signaling, the reuse transmission device performs data transmission processing by using spatial reuse transmission signaling corresponding to a transmission bandwidth of the reuse transmission device. For example, as shown in FIG. 6, when 20 MHz bandwidth used by the reuse transmission device during reuse transmission is corresponding to a second 20 MHz sub-bandwidth of the primary link, spatial reuse transmission signaling corresponding to bits b4 to b7 is selected, to obtain corresponding allowed maximum interference power. Then, maximum transmit power that can be used during reuse transmission is further calculated.

It should be understood that, if the transmission bandwidth used by the reuse transmission device is greater than a sub-bandwidth of the primary link, the reuse transmission device needs to select a minimum value from multiple spatial reuse transmission parameters corresponding to a sub-bandwidth set that includes the transmission bandwidth used by the reuse transmission device, to calculate maximum transmit power that can be used during reuse transmission. For example, as shown in FIG. 6, the reuse transmission device uses a 40 MHz transmission bandwidth greater than a 20 MHz sub-bandwidth. The reuse transmission device needs to select a minimum value from spatial reuse transmission parameters corresponding to bits b0 to b7, to calculate the maximum transmit power that can be used by the reuse transmission device.

Optionally, the spatial reuse transmission signaling includes power indication information. The power indication information is used to indicate maximum transmit power that can be used when the reuse transmission device uses all or some of the time-frequency resources of the primary link to transmit data.

Optionally, the spatial reuse transmission signaling is determined by the primary access point according to the determining parameter. The determining parameter is maximum interference power that is allowed when the primary access point receives the uplink data frame sent by the primary station.

The primary station is scheduled by the primary access point to send the uplink data frame, and adds the spatial reuse transmission signaling to the sent uplink data frame, so that the reuse transmission device of the spatial reuse link obtains the spatial reuse transmission signaling from the uplink data frame, and then performs, according to the spatial reuse transmission signaling, data transmission processing based on the spatial reuse link, to reduce interference to the primary link.

Therefore, according to the data transmission method in this embodiment of the present invention, mutual interference between the primary link and the spatial reuse link during data transmission can be reduced, and transmission quality can be improved.

Figure 7:
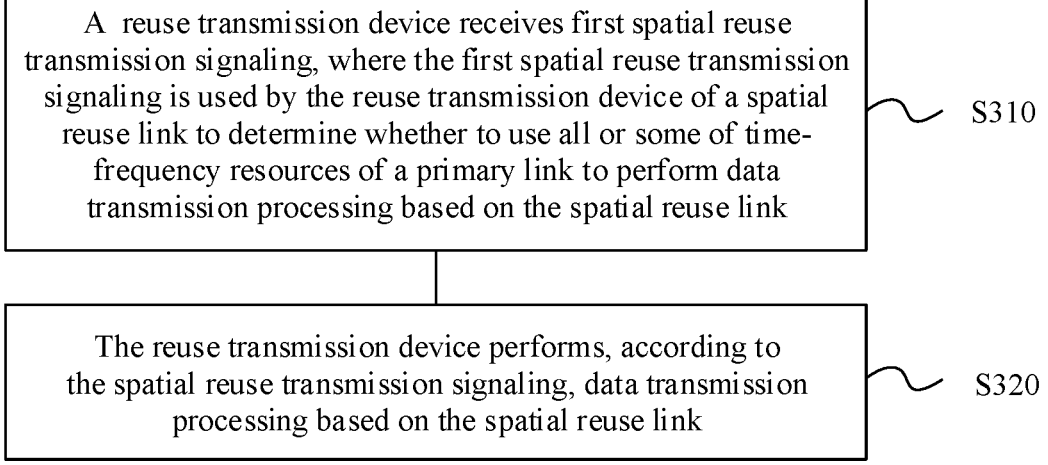
FIG. 7 is a schematic flowchart of a data transmission method according to still another embodiment of the present invention.

FIG. 7 is a schematic flowchart of a data transmission method 300 described from a perspective of a reuse transmission device in an embodiment of the present invention. As shown in FIG. 7, the method 300 includes the following steps:

S310. The reuse transmission device receives first spatial reuse transmission signaling, where the first spatial reuse transmission signaling is used by the reuse transmission device of a spatial reuse link to determine whether to use all or some of time-frequency resources of a primary link to transmit data.

S320. The reuse transmission device performs, according to the spatial reuse transmission signaling, data transmission processing based on the spatial reuse link.

It should be understood that the first spatial reuse transmission signaling is corresponding to a determining result obtained after a primary access point performs determining processing according to a first determining parameter. The determining processing is used to determine whether the reuse transmission device of the spatial reuse link is allowed to use all or some of the time-frequency resources of the primary link to transmit data.

Specifically, the reuse transmission device receives the first spatial reuse transmission signaling. For example, the first spatial reuse transmission signaling may be obtained from a trigger frame that is sent by the primary access point to the primary station, or may be obtained from an uplink data frame that is sent by the primary station to the primary access point. Then, the reuse transmission device may perform, according to the first spatial reuse transmission signaling, data transmission processing based on the spatial reuse link. For example, the reuse transmission device may learn, from the first spatial reuse transmission signaling, that reuse transmission on the spatial reuse link is prohibited while data transmission on the primary link is performed; or the reuse transmission device learns, from the spatial reuse transmission signaling, that the primary access point allows the reuse transmission device to use all or some of the time-frequency resources of the primary link to transmit data.

Therefore, according to the data transmission method in this embodiment of the present invention, mutual interference between the primary link and the spatial reuse link during data transmission can be reduced, and transmission quality can be improved.

Optionally, the first spatial reuse transmission signaling includes second spatial reuse transmission signaling that is used to prohibit the reuse transmission device from using all or some of the time-frequency domain resources of the primary link to transmit data.

That the reuse transmission device performs, according to the spatial reuse transmission signaling, data transmission processing based on the spatial reuse link includes:

giving up, by the reuse transmission device according to the second spatial reuse transmission signaling, using all or some of the time-frequency resources of the primary link to transmit data.

Optionally, the first spatial reuse transmission signaling includes third spatial reuse transmission signaling that is used to allow the reuse transmission device to use all or some of the time-frequency domain resources of the primary link to transmit data.

That the reuse transmission device performs, according to the spatial reuse transmission signaling, data transmission processing based on the spatial reuse link includes:

performing, by the reuse transmission device according to the third spatial reuse transmission signaling, data transmission processing based on the spatial reuse link.

For example, when the reuse transmission device learns, from the spatial reuse transmission signaling, that the reuse transmission device can use all or some of the time-frequency resources of the primary link to perform concurrent transmission, the reuse transmission device may transmit data according to a spatial reuse transmission parameter indicated in the spatial reuse transmission signaling, or may choose, with reference to other information about the link, to give up this concurrent transmission opportunity.

Optionally, there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and $N \geq 2$.

That the reuse transmission device performs, according to the first spatial reuse transmission signaling, data transmission processing based on the spatial reuse link includes:

performing, by the reuse transmission device according to the N pieces of first spatial reuse transmission signaling, data transmission processing based on the spatial reuse link.

The reuse transmission device receives the trigger frame or the uplink data frame that carries the spatial reuse transmission signaling, and determines whether the trigger frame or the uplink data frame is a transmission frame of a current BSS. If the trigger frame or the uplink data frame is not the transmission frame of the current BSS, the reuse transmission device performs corresponding data processing according to the spatial reuse transmission signaling carried in the trigger frame or the uplink data frame. For example, if the reuse transmission device receives signaling that carries a spatial reuse transmission parameter, the reuse transmission device may calculate, according to the spatial reuse transmission parameter, maximum transmit power allowed during spatial reuse transmission. $P_{SR\_max}^{Tx} = \tilde{I}_{max\_level} \cdot L_{SR}$, where $\tilde{I}_{max\_level}$ in the formula is allowed maximum interference power that is determined according to a spatial reuse transmission parameter corresponding to a transmission bandwidth of the reuse transmission device. For example, if 20 MHz bandwidth corresponding to the transmission bandwidth used during spatial reuse transmission is a second 20 MHz transmission sub-bandwidth of the primary link, a spatial reuse transmission parameter corresponding to bits b4 to b7 is selected, to obtain corresponding allowed maximum interference power.

Before the reuse transmission device sends data, clear channel assessment (CCA) is performed. If the CCA detection succeeds, after random backoff ends, a data packet may be sent by using transmit power that is not greater than $P_{SR\_max}^{Tx}$. The CCA detection method may be a CCA detection method in an existing standard, for example, 11n or 11ac; or may be another new detection method. This is not limited in the present invention. For example, the reuse transmission device may set a CCA threshold according to an RSSI (Received Signal Strength Indication, received signal strength indicator) value of a received primary link signal. Optionally, the reuse transmission device sets, to the CCA detection threshold, an RSSI value corresponding to an end moment or S seconds before an end moment of a SIGA field in the uplink data frame received on the primary link.

For another example, the reuse transmission device receives two pieces of spatial reuse transmission signaling. Concurrent transmission is prohibited on a first 20 MHz transmission sub-bandwidth, and concurrent transmission is allowed on a second 20 MHz transmission sub-bandwidth. Therefore, the reuse transmission device can perform reuse transmission by using the second 20 MHz transmission sub-bandwidth of the primary link.

For still another example, if the reuse transmission device uses a 40 MHz bandwidth to perform reuse transmission, and the transmission bandwidth of the primary link is divided into a 20 MHz sub-bandwidth, a 10 MHz sub-bandwidth, and a 10 MHz sub-bandwidth, the reuse transmission device needs to select a minimum value from maximum interference power values corresponding to a basic sub-bandwidth set including the 20 MHz bandwidth, 10 MHz bandwidth, and 10 MHz bandwidth, to calculate the maximum transmit power that can be used during concurrent transmission.

Optionally, the spatial reuse transmission signaling is determined by the primary access point according to the first determining parameter. The first determining parameter is determined by the primary access point according to an uplink transmission parameter used by the primary station. The uplink transmission parameter includes transmit power, a modulation and coding scheme MCS, and a transmission bandwidth.

It should be understood that the first determining parameter herein may also be considered as a related parameter according to which the primary access point performs determining processing. For example, the first determining parameter may be the transmit power, the modulation and coding scheme MCS, and the transmission bandwidth of the primary station; or may be the MCS and receive power of the primary access point.

Optionally, when the result obtained after the determining processing is that the reuse transmission device of the spatial reuse link is allowed to use all or some of the time-frequency resources of the primary link to transmit data, the spatial reuse transmission signaling includes power indication information.

That the reuse transmission device performs, according to the first spatial reuse transmission signaling, data transmission processing based on the spatial reuse link includes:

determining, by the reuse transmission device according to the power indication information, the maximum transmit power that can be used when the reuse transmission device uses all or some of the time-frequency resources of the primary link to transmit data, and transmitting data by using transmit power that is not greater than the maximum transmit power.

Specifically, when the first spatial reuse transmission signaling received by the reuse transmission device indicates that reuse transmission of the spatial reuse link is allowed, the first spatial reuse transmission signaling may carry the power indication information. Herein, the power indication information may be the maximum interference power that is allowed when the primary access point receives the uplink data frame. The reuse transmission device may determine, according to the maximum interference power, the maximum transmit power that can be used during reuse transmission, to avoid mutual interference between the primary link and the spatial reuse link during data transmission.

Optionally, the reuse transmission device and the primary access point belong to different basic service sets BSSs.

It should be understood that, in this embodiment of the present invention, the reuse transmission device and the primary access point may belong to different BSSs, or may belong to a same BSS. However, in this embodiment, the foregoing descriptions are all given on a premise that the reuse transmission device and the primary access point belong to different BSSs. The following describes in detail a case in which the reuse transmission device and the primary access point belong to a same BSS.

Optionally, the reuse transmission device and the primary access point belong to a same basic service set BSS, and the spatial reuse link is used for D2D transmission between stations in the BSS.

That is, when the primary access point and the reuse transmission device belong to a same BSS, the primary link is used for uplink multiuser UL MU transmission in the BSS, and the spatial reuse link is used for device-to-device (D2D) transmission between stations in the same BSS. In this case, the reuse transmission device may also be referred to as a D2D transmission station, and SR transmission is D2D transmission.

Optionally, that the reuse transmission device performs, according to the spatial reuse transmission signaling, data transmission processing based on the spatial reuse link includes:

adding, by the reuse transmission device, D2D transmission indication information to a data frame during the D2D transmission, where the D2D transmission indication information is used to prohibit a D2D station in the BSS except the reuse transmission device from using this D2D transmission opportunity.

Specifically, the D2D transmission station receives the trigger frame or the uplink data frame that carries the spatial reuse transmission signaling, and determines whether the trigger frame or the uplink data frame is a transmission frame of the BSS. If the trigger frame or the uplink data frame is the transmission frame of the BSS, maximum transmit power allowed during D2D transmission is calculated according to the spatial reuse transmission signaling carried in the trigger frame or the uplink data frame. If the trigger frame or the uplink data frame is not the transmission frame of the BSS, maximum transmit power allowed during D2D transmission may be calculated according to an existing standard procedure, or may be calculated according to the procedure in the foregoing embodiment. This is not limited in the present invention. In addition, the D2D transmission station may use 1-bit indication information in a signaling A field in a preamble of a transmission frame to indicate whether current transmission is D2D transmission. For example, "1" indicates that the transmission frame is a D2D data frame, and "0" indicates that the transmission frame is a common data frame. After another D2D transmission station in the BSS receives the trigger frame of the BSS, the another D2D transmission station calculates, according to the foregoing procedure, maximum transmit power allowed during D2D transmission, and CCA detection is subsequently performed. It is assumed that the CCA detection succeeds, and the another D2D transmission station further receives a data frame of the BSS in a random backoff process. In this case, if the another D2D transmission station determines that 1-bit indication information in the data frame is "1", the another D2D transmission station gives up this reuse transmission opportunity before transmission of the D2D data frame ends; or if the another D2D transmission station determines that 1-bit indication information is "0", the another D2D transmission station continues to perform a reuse procedure.

Optionally, that the reuse transmission device determines, according to the first determining parameter, the maximum transmit power that can be used when the reuse transmission device uses all or some of the time-frequency resources of the primary link to transmit data includes:

determining the maximum transmit power according to a formula $P_{SR\_max}^{Tx} = \tilde{I}_{max\_level} \cdot L_{SR}$, where $P_{SR\_max}^{Tx}$ indicates the maximum transmit power, $\tilde{I}_{max\_level}$ indicates the maximum interference power, and $L_{SR}$ indicates a loss during transmission from the reuse transmission device to the primary access point.

For example, the reuse transmission device performs calculation according to receive power of a beacon frame that is received from an AP 1. $L_{SR} = P_{AP1}^{Tx} / P_{AP1}^{Rx}$, where $P_{AP1}^{Tx}$ is transmit power by using which the AP 1 sends the beacon frame, and $I_{max\_level}^{\%}$ is the allowed maximum interference power determined according to the spatial reuse transmission signaling. For example, according to a preset rule, if the spatial reuse transmission signaling is "0010", the corresponding allowed maximum interference power is max $I_{max\_level}^{\%} = 70$ dBm. Assuming that the transmission loss obtained according to historical information is $L_{SR} = 77$ dB, the maximum transmit power allowed during reuse transmission is $P_{SR\_max}^{Tx} = 7$ dBm.

Optionally, the communications system further includes a third-party device, and the method further includes:

generating, by the reuse transmission device, fourth spatial reuse transmission signaling;

adding, by the reuse transmission device, the fourth spatial reuse transmission signaling to the data frame during the data transmission, so that the third-party device gives up using this reuse transmission opportunity when receiving the fourth spatial reuse transmission signaling.

Specifically, in a data transmission process, the reuse transmission device does not want a third-party device to use this reuse transmission opportunity. Therefore, the reuse transmission device adds the fourth spatial reuse transmission signaling to the sent data frame. In this case, if there is a third-party device in the communications system, and the third-party device is relatively close to both the primary access point and the reuse transmission device, the third-party device may not only obtain the spatial reuse transmission signaling of the primary access point by means of listening, but also obtain, by means of listening, the fourth spatial reuse transmission signaling sent by the reuse transmission device. In this case, even though the third-party device obtains, by means of listening, the signaling for allowing reuse transmission on the primary link, because the fourth spatial reuse transmission signaling prohibits the third-party device from performing reuse transmission at a same time with the reuse transmission device, the third-party device cannot use this reuse transmission opportunity.

Therefore, according to the data transmission method in this embodiment of the present invention, mutual interference between the primary link and the spatial reuse link can be reduced, and transmission quality can be improved.

The foregoing describes the data transmission method in the embodiments of the present invention in a case in which the primary link is an uplink. A data transmission method in the embodiments of the present invention in a case in which the primary link is a downlink is similar to the method in the case in which the primary link is an uplink. For brevity, the following makes a brief description.

First, the primary access point performs determining processing according to historical information of the primary link or a transmission parameter used by the primary access point when the primary access point sends a downlink frame, to determine whether reuse transmission of the reuse transmission device is allowed.

For example, the primary access point performs determining processing according to an MCS used when a downlink data frame is sent. If an index of the MCS is greater than or equal to 5, reuse transmission of the reuse transmission device is allowed; or if the index of the MCS is less than 5, reuse transmission of the reuse transmission device is prohibited.

It should be understood that, similar to the case in which the primary link is an uplink, only the example in which the index of the MCS is 5 is used for description. This embodiment of the present invention is not limited thereto. For example, if the index of the MCS is greater than or equal to 3, reuse transmission is allowed; or if the index of the MCS is less than 3, reuse transmission is prohibited. In addition, the index of the MCS may be further compared with a preset threshold.

Then, the primary access point generates spatial reuse transmission signaling according to a determining result obtained after the determining processing, and adds the spatial reuse transmission signaling to the downlink frame and sends the downlink frame, so that the reuse transmission device obtains the spatial reuse transmission signaling from the downlink frame, and performs, according to the spatial reuse transmission signaling, data transmission processing based on the spatial reuse link.

It should be understood that a process of generating the spatial reuse transmission signaling is similar to the process in the case in which the primary link is an uplink. Therefore, there may be one piece of spatial reuse transmission signaling, or may be multiple pieces of spatial reuse transmission signaling.

Correspondingly, for the reuse transmission device of the spatial reuse link, when the primary link is a downlink, the reuse transmission device may obtain the spatial reuse transmission signaling from the downlink frame that is sent by the primary access point to the primary station.

With reference to the data transmission method in this embodiment of the present invention in the case in which the primary link is an uplink, for the reuse transmission device of the spatial reuse link, at least three manners for obtaining the spatial reuse transmission signaling are included. That is, the spatial reuse transmission signaling is obtained from a trigger frame that is sent by the primary access point to the primary station, or is obtained from an uplink data frame that is sent by the primary station to the primary access point, or is obtained from a downlink data frame that is sent by the primary access point to the primary station.

Similarly, when the primary link is a downlink, after the reuse transmission device obtains a spatial reuse transmission parameter from the downlink frame sent by the primary access point, if the reuse transmission device uses, according to the spatial reuse transmission parameter, all or some of the time-frequency resources of the primary link to transmit data, the reuse transmission device may generate spatial reuse transmission signaling (or the fourth spatial reuse transmission signaling) of the spatial reuse link. The spatial reuse transmission signaling is used to prohibit the third-party device in the communications system from using this reuse transmission opportunity when the third-party device receives the spatial reuse transmission signaling.

It should be noted that, if the reuse transmission device does not want to perform reuse transmission at a same time with the third-party device, the reuse transmission device may directly generate the fourth spatial reuse transmission signaling without performing any determining processing. In addition, the reuse transmission device may generate the fourth spatial reuse transmission signaling according to the determining result obtained after the determining processing. A determining processing method and a process of generating the fourth spatial reuse transmission signaling are the same as those in the case in which the primary link is an uplink. Details are not described herein again.

Similarly, when the primary link is a downlink, optionally, the reuse transmission device sets, to a CCA detection threshold, an RSSI value corresponding to an end moment or S seconds before an end moment of a SIGA field in the downlink frame received on the primary link.

Therefore, according to the data transmission method in this embodiment of the present invention, the reuse transmission device obtains the spatial reuse transmission signaling of the primary link, and performs data transmission processing based on the spatial reuse link, so that the spatial reuse link causes no interference to data transmission on the primary link, or data is transmitted in a case in which caused interference falls within an allowed range of the primary link. Therefore, interference between the primary link and the spatial reuse link can be reduced, and transmission quality can be improved.

Figure 8:
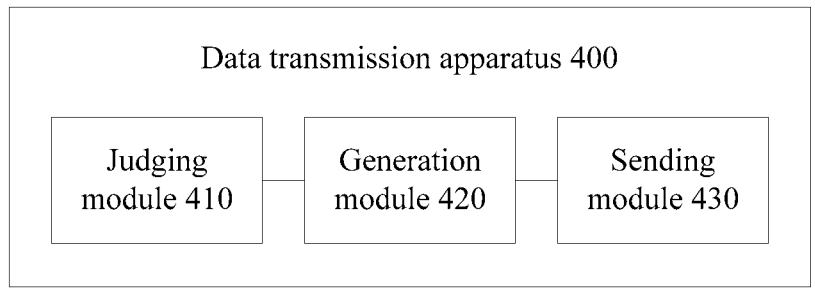
FIG. 8 is a schematic block diagram of a data transmission apparatus according to an embodiment of the present invention.
Figure 9:
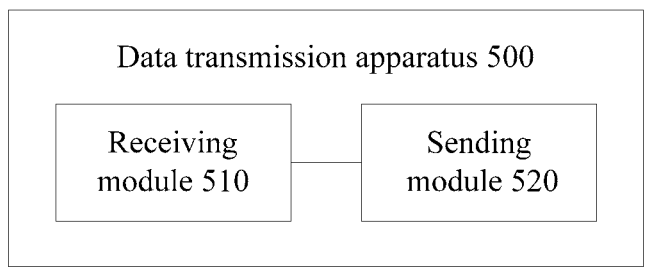
FIG. 9 is a schematic block diagram of a data transmission apparatus according to another embodiment of the present invention.
Figure 10:
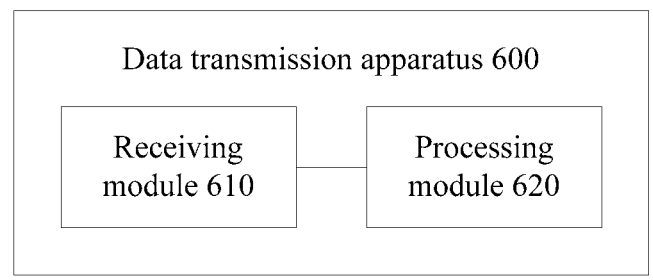
FIG. 10 is a schematic block diagram of a data transmission apparatus according to still another embodiment of the present invention.

With reference to FIG. 1 to FIG. 7, the foregoing describes in detail the data transmission method in the embodiments of the present invention. With reference to FIG. 8 to FIG. 10, the following describes a data transmission apparatus in the embodiments of the present invention.

FIG. 8 is a schematic block diagram of a data transmission apparatus 400 according to an embodiment of the present invention. As shown in FIG. 8, the apparatus 400 includes:

a judging module 410, configured to perform determining processing according to a determining parameter, where the determining processing is used to determine whether a reuse transmission device of a spatial reuse link is allowed to use all or some of time-frequency resources of a primary link to transmit data;

a generation module 420, configured to generate spatial reuse transmission signaling according to a determining result obtained after the judging module performs determining processing; and a sending module 430, configured to send the spatial reuse transmission signaling generated by the generation module, so that the reuse transmission device performs, according to the spatial reuse transmission signaling, data transmission processing based on the spatial reuse link.

Optionally, the generation module is further configured to: generate first spatial reuse transmission signaling that is used to indicate that the reuse transmission device is prohibited from using all or some of the time-frequency resources of the primary link to transmit data; or generate second spatial reuse transmission signaling that is used to indicate that the reuse transmission device is allowed to use all or some of the time-frequency resources of the primary link to transmit data.

Optionally, the judging module is further configured to perform determining processing according to N determining parameters. The N determining parameters are in a one-to-one correspondence with N transmission sub-bandwidths of the primary link, each determining parameter is used to determine whether the reuse transmission device is allowed to use a corresponding transmission sub-bandwidth, and N≥2.

Specifically, the generation module is further configured to generate N pieces of spatial reuse transmission signaling according to the determining result obtained after the determining processing. The N pieces of spatial reuse transmission signaling are in a one-to-one correspondence with the N transmission sub-bandwidths.

Optionally, the sending module is further configured to send the spatial reuse transmission signaling to the primary station, so that the primary station adds the spatial reuse transmission signaling to an uplink data frame when sending the uplink data frame, and the reuse transmission device obtains the spatial reuse transmission signaling from the uplink data frame.

Optionally, the generation module is further configured to: when the result obtained after the determining processing is that the reuse transmission device is allowed to use all or some of the time-frequency resources of the primary link to transmit data, generate the spatial reuse transmission signaling that includes power indication information. The power indication information is used by the reuse transmission device to determine maximum transmit power that can be used when the reuse transmission device uses all or some of the time-frequency resources of the primary link to transmit data.

Optionally, a determining module is configured to: before the judging module performs determining processing, determine the determining parameter according to a transmission parameter used by the primary station. The transmission parameter includes transmit power, a modulation and coding scheme MCS, and a transmission bandwidth.

Optionally, the determining module is further configured to determine maximum interference power that is allowed when the apparatus receives the uplink data frame sent by the primary station.

Optionally, a communications system includes at least two primary stations, and the determining module is further configured to:

determine maximum interference power densities that are allowed when the apparatus receives uplink data frames sent by all of the at least two primary stations;

determine a minimum value from the maximum interference power densities; and determine the maximum interference power according to the minimum value.

Optionally, the determining module is further configured to:

determine, according to a formula $$isd_{STAk} = \frac{(P_{STAk}^{Tx}/L_{STAk})}{SINR_{STAk}^{required}} \cdot \frac{1}{BW_{STAk}},$$

a maximum interference power density that is allowed when an uplink data frame sent by a station k in the at least two primary stations is received, where $isd_{STAk}$ indicates the maximum interference power density that is allowed when the apparatus receives the uplink data frame sent by the station k, $P_{STAk}^{Tx}$ indicates transmit power used by the station k to send the uplink data frame, $SINR_{STAk}^{required}$ indicates a minimum signal to interference plus noise ratio that is required when the apparatus receives the uplink data frame sent by the station k, and $BW_{STAk}$ indicates a transmission bandwidth used when the station k sends the uplink data frame.

Optionally, the determining module is further configured to:

determine the maximum interference power on a transmission bandwidth of the primary link according to a formula $$I_{max\_level} = \min_{STAk}\{isd_{STAk}\} \cdot BW_{total}/\text{Redundancy};$$

or determine maximum interference power on an $m^{th}$ sub-bandwidth in the N transmission sub-bandwidths according to a formula $$I_{max\_level}^m = \min_{STAk \in \{m^{th}sub-band\}}\{isd_{STAk}\} \cdot BW^m/\text{Redundancy},$$

where $I_{max\_level}$ indicates the maximum interference power, $$\min_{STAk}\{isd_{STAk}\}$$

indicates the minimum value determined by the apparatus from the maximum interference power densities, $BW_{total}$ indicates the transmission bandwidth of the primary link, Redundancy indicates a redundancy reserved in the system, $I_{max\_level}^m$ indicates the maximum interference power on the $m^{th}$ sub-bandwidth, $BW^m$ indicates the $m^{th}$ sub-bandwidth in the N transmission sub-bandwidths, N≥2, and 1≤m≤N.

Optionally, the sending module is further configured to send a trigger frame to the primary station. A signaling A field or load information of the trigger frame carries the spatial reuse transmission signaling.

The data transmission apparatus 400 in this embodiment of the present invention may be corresponding to the primary access point in the data transmission method in the embodiments of the present invention. The foregoing operations and/or functions of the modules in the apparatus 400 are used to implement the corresponding procedures of the method in FIG. 2. For brevity, details are not described herein again.

The data transmission apparatus in this embodiment of the present invention performs determining processing according to the determining parameter, to determine whether the reuse transmission device of the spatial reuse link is allowed to use all or some of the time-frequency resources of the primary link to transmit data; and generates the spatial reuse transmission signaling corresponding to the determining result. Finally, the apparatus sends the spatial reuse transmission signaling, so that after obtaining the spatial reuse transmission signaling, the reuse transmission device performs data transmission processing based on the spatial reuse link. Therefore, according to the data transmission apparatus in the embodiments of the present invention, mutual interference between the primary link and the spatial reuse link during data transmission can be reduced, and transmission quality can be improved.

FIG. 9 is a schematic block diagram of a data transmission apparatus 500 according to an embodiment of the present invention. As shown in FIG. 9, the apparatus 500 includes:

a receiving module 510, configured to receive spatial reuse transmission signaling sent by a primary access point, where the spatial reuse transmission signaling is corresponding to a determining result obtained after the primary access point performs determining processing according to a determining parameter, and the determining processing is used to determine whether a reuse transmission device of a spatial reuse link is allowed to use all or some of time-frequency resources of a primary link to transmit data;

a sending module 520, configured to send an uplink data frame to the primary access point, where the uplink data frame carries the spatial reuse transmission signaling, so that the reuse transmission device of the spatial reuse link obtains the spatial reuse transmission signaling from the uplink data frame, and performs, according to the spatial reuse transmission signaling, data transmission processing based on the spatial reuse link.

Optionally, the spatial reuse transmission signaling includes first spatial reuse transmission signaling that is used to indicate that the reuse transmission device is prohibited from using all or some of the time-frequency resources of the primary link to transmit data; or the spatial reuse transmission signaling includes second spatial reuse transmission signaling that is used to indicate that the reuse transmission device is allowed to use all or some of the time-frequency resources of the primary link to transmit data.

Optionally, when there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and N≥2. The sending module is further configured to:

add the N pieces of spatial reuse transmission signaling to a signaling A field of an uplink data frame on each of the N transmission sub-bandwidths, where N≥2; or add, to a signaling A field of an uplink data frame on an $m^{th}$ transmission sub-bandwidth in the N transmission sub-bandwidths, an $m^{th}$ piece of spatial reuse transmission signaling corresponding to the $m^{th}$ transmission sub-bandwidth, where m≥1.

Optionally, the spatial reuse transmission signaling includes power indication information. The power indication information is used to indicate maximum transmit power that can be used when the reuse transmission device uses all or some of the time-frequency resources of the primary link to transmit data.

Optionally, the spatial reuse transmission signaling is determined by the primary access point according to the determining parameter. The determining parameter is maximum interference power that is allowed when the primary access point receives the uplink data frame sent by the apparatus.

The data transmission apparatus 500 in this embodiment of the present invention may be corresponding to the primary station in the data transmission method in the embodiments of the present invention. The foregoing operations and/or functions of the modules in the apparatus 500 are used to implement the corresponding procedures of the method in FIG. 5. For brevity, details are not described herein again.

The data transmission apparatus 500 in this embodiment of the present invention adds the spatial reuse transmission signaling to the uplink data frame sent to the primary access point, so that the reuse transmission device can obtain the spatial reuse transmission signaling from the uplink data frame, and performs data transmission processing based on the spatial reuse link. Therefore, mutual interference between the primary link and the spatial reuse link during data transmission can be reduced, and transmission quality can be improved.

FIG. 10 is a schematic block diagram of a data transmission apparatus 600 according to an embodiment of the present invention. As shown in FIG. 10, the apparatus 600 includes:

a receiving module 610, configured to receive first spatial reuse transmission signaling, where the first spatial reuse transmission signaling is corresponding to a determining result obtained after a primary access point performs determining processing according to a first determining parameter, and the determining processing is used to determine whether the apparatus of a spatial reuse link is allowed to use all or some of time-frequency resources of a primary link to transmit data; and a processing module 620, configured to perform, according to the first spatial reuse transmission signaling, data transmission processing based on the spatial reuse link.

Optionally, when the spatial reuse transmission signaling includes second spatial reuse transmission signaling that is used to prohibit the apparatus from using all or some of the time-frequency domain resources of the primary link to transmit data, the processing module is further configured to give up, according to the second spatial reuse transmission signaling, using all or some of the time-frequency resources of the primary link to transmit data.

Optionally, when the spatial reuse transmission signaling includes third spatial reuse transmission signaling that is used to allow the apparatus to use all or some of the time-frequency domain resources of the primary link to transmit data, the processing module is further configured to perform, according to the third spatial reuse transmission signaling, data transmission processing based on the spatial reuse link.

Optionally, there are N pieces of first spatial reuse transmission signaling, the N pieces of first spatial reuse transmission signaling are in a one-to-one correspondence with N transmission sub-bandwidths of the primary link, each piece of spatial reuse transmission signaling is used to determine whether the apparatus is allowed to use a corresponding transmission sub-bandwidth, and N≥2.

The processing module is further configured to perform, according to the N pieces of spatial reuse transmission signaling, data transmission processing based on the spatial reuse link.

Optionally, the spatial reuse transmission signaling is determined by the primary access point according to the first determining parameter. The first determining parameter is determined by the primary access point according to a transmission parameter used by the primary station. The transmission parameter includes transmit power, a modulation and coding scheme MCS, and a transmission bandwidth.

Optionally, the apparatus 600 further includes:

a determining module, configured to: when the spatial reuse transmission signaling includes the first determining parameter, determine, according to the first determining parameter, maximum transmit power that can be used when all or some of the time-frequency resources of the primary link are used to transmit data.

The apparatus further includes a transmission module. The transmission module is further configured to transmit data by using transmit power that is not greater than the maximum transmit power.

Optionally, the apparatus and the primary access point belong to different basic service sets BSSs.

Optionally, the apparatus and the primary access point belong to a same basic service set BSS, and the spatial reuse link is used for D2D transmission between stations in the BSS.

Optionally, the processing module is further configured to add D2D transmission indication information to a data frame during the D2D transmission. The D2D transmission indication information is used to prohibit a D2D station in the BSS except the apparatus from using this D2D transmission opportunity.

Optionally, the first determining parameter is maximum interference power that is allowed when the primary access point receives an uplink data frame sent by the primary station.

Optionally, the determining module is further configured to determine the maximum transmit power according to a formula $P_{SR\_max}^{Tx} = \tilde{I}_{max\_level} \cdot L_{SR}$, where $P_{SR\_max}^{Tx}$ indicates the first maximum transmit power, $\tilde{I}_{max\_level}$ indicates the maximum interference power, and $L_{SR}$ indicates a loss during transmission from the apparatus to the primary access point.

Optionally, a communications system further includes a third-party device. The apparatus 600 further includes a generation module. The generation module is configured to generate fourth spatial reuse transmission signaling.

The processing module is further configured to add the fourth spatial reuse transmission signaling to the data frame during the data transmission, so that the third-party device gives up using this reuse transmission opportunity when receiving the fourth spatial reuse transmission signaling.

The data transmission apparatus 600 in this embodiment of the present invention may be corresponding to the reuse transmission device in the data transmission method in the embodiments of the present invention. The foregoing operations and/or functions of the modules in the apparatus 600 are used to implement the corresponding procedures of the method in FIG. 7. For brevity, details are not described herein again.

The data transmission apparatus 600 in this embodiment of the present invention receives the spatial reuse transmission signaling sent by the primary access point or the primary station, to perform, according to the spatial reuse transmission signaling, data transmission processing based on the spatial reuse link. Therefore, mutual interference between the primary link and the spatial reuse link during data transmission can be reduced, and transmission quality can be improved.

Figure 11:
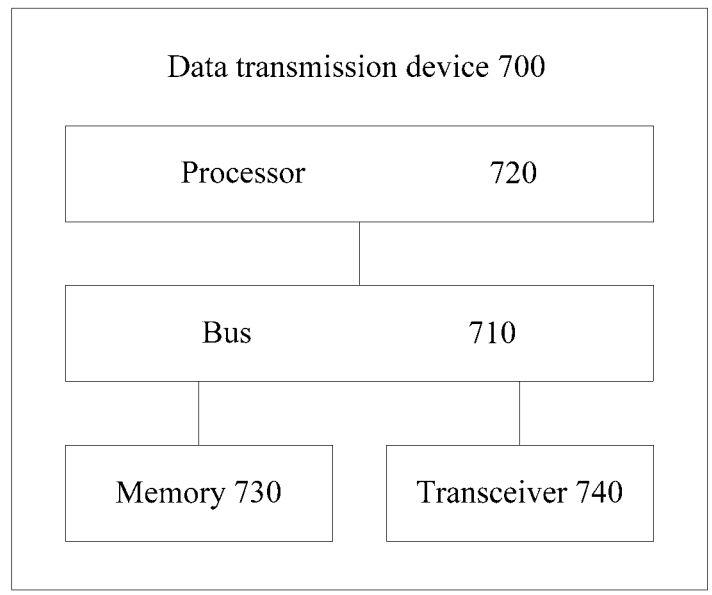
FIG. 11 is a schematic structural diagram of a data transmission device according to an embodiment of the present invention.

FIG. 11 is a data transmission device 700 according to an embodiment of the present invention. As shown in FIG. 11, the device 700 includes:
a bus 710;
a processor 720 connected to the bus 710;
a memory 730 connected to the bus 710; and
a transceiver 740 connected to the bus 710.

The processor 720 invokes, by using the bus 710, a program stored in the memory 730, so as to: perform, according to a determining parameter, determining processing on whether a reuse transmission device of a spatial reuse link is allowed to use all or some of time-frequency resources of a primary link to transmit data, generate spatial reuse transmission signaling according to a result obtained after the determining processing, and send the spatial reuse transmission signaling by using the transceiver 740.

Optionally, the spatial reuse transmission signaling includes first spatial reuse transmission signaling that is used to indicate that the reuse transmission device is prohibited from using all or some of the time-frequency resources of the primary link to transmit data; or
the spatial reuse transmission signaling includes second spatial reuse transmission signaling that is used to indicate that the reuse transmission device is allowed to use all or some of the time-frequency resources of the primary link to transmit data.

Optionally, the processor 720 is specifically configured to perform determining processing according to N determining parameters. The N determining parameters are in a one-to-one correspondence with N transmission sub-bandwidths of the primary link, each determining parameter is used to determine whether the reuse transmission device is allowed to use a corresponding transmission sub-bandwidth, and N≥2. The processor 720 generates N pieces of spatial reuse transmission signaling according to the determining result obtained after the determining processing. The N pieces of spatial reuse transmission signaling are in a one-to-one correspondence with the N transmission sub-bandwidths.

Optionally, the transceiver 740 is specifically configured to send the spatial reuse transmission signaling to the primary station, so that the primary station adds the spatial reuse transmission signaling to an uplink data frame when sending the uplink data frame, and the reuse transmission device obtains the spatial reuse transmission signaling from the uplink data frame.

Optionally, when the determining result obtained after the determining processing is that the reuse transmission device is allowed to use all or some of the time-frequency resources of the primary link to transmit data, the spatial reuse transmission signaling includes power indication information. The power indication information is used to indicate maximum transmit power that can be used when the reuse transmission device uses all or some of the time-frequency resources of the primary link to transmit data.

Optionally, the processor 720 is specifically configured to: before performing determining processing according to the determining parameter, determine the determining parameter according to a transmission parameter used by the primary station. The transmission parameter includes transmit power, a modulation and coding scheme MCS, and a transmission bandwidth.

Optionally, the determining parameter is maximum interference power that is allowed when the device 700 receives the uplink data frame sent by the primary station.

Optionally, when a communications system includes at least two primary stations, the processor 720 is specifically configured to:
determine, according to transmission parameters used by all of the at least two primary stations, maximum interference power densities that are allowed when uplink data frames sent by all of the at least two primary stations are received;
determine a minimum value from the maximum interference power densities; and
determine the maximum interference power according to the minimum value.

Optionally, the processor 720 is specifically configured to: determine, according to a formula $$isd_{STAk} = \frac{(P^{Tx}_{STAk} / L_{STAk})}{SINR^{required}_{STAk}} \cdot \frac{1}{BW_{STAk}},$$

a maximum interference power density that is allowed when an uplink data frame sent by a station k in the at least two primary stations is received, where $isd_{STAk}$ indicates the maximum interference power density that is allowed when the device receives the uplink data frame sent by the station k, $P^{Tx}_{STAk}$ indicates transmit power used by the station k to send the uplink data frame, $SINR^{required}_{STAk}$ indicates a minimum signal to interference plus noise ratio that is required when the device receives the uplink data frame sent by the station k, and $BW_{STAk}$ indicates a transmission bandwidth used when the station k sends the uplink data frame.

Optionally, the processor 720 is specifically configured to: determine the maximum interference power on a transmission bandwidth of the primary link according to $$I_{max\_level} = \min_{STAk} \{isd_{STAk}\} \cdot BW_{total} / \text{Redundancy};$$

or determine maximum interference power on an $m^{th}$ sub-bandwidth in the N transmission sub-bandwidths according to a formula $$I^m_{max\_level} = \min_{STAk \in \{m^{th} sub-band\}} \{isd_{STAk}\} \cdot BW^m / \text{Redundancy},$$

where $I_{max\_level}$ indicates the maximum interference power, $$\min_{STAk}\{isd_{STAk}\}$$

indicates the minimum value determined by the device from the maximum interference power densities, $BW_{total}$ indicates the transmission bandwidth of the primary link, Redundancy indicates a redundancy reserved in the system, $I_{max\_level}{}^m$ indicates the maximum interference power on the $m^{th}$ sub-bandwidth, $BW^m$ indicates the $m^{th}$ sub-bandwidth in the N transmission sub-bandwidths, N is a positive integer that is greater than or equal to 2, and m is a positive integer that is greater than or equal to 1 and less than or equal to N.

Optionally, the transceiver 740 is specifically configured to send a trigger frame to the primary station. A signaling A field or load information of the trigger frame carries the spatial reuse transmission signaling.

The data transmission device 700 in this embodiment of the present invention may be corresponding to the primary access point in the data transmission method in the embodiments of the present invention. The modules in the data transmission device 700 and the foregoing other operations and/or functions are used to implement the corresponding procedures of the method 100 in FIG. 2. For brevity, details are not described herein again.

Figure 12:
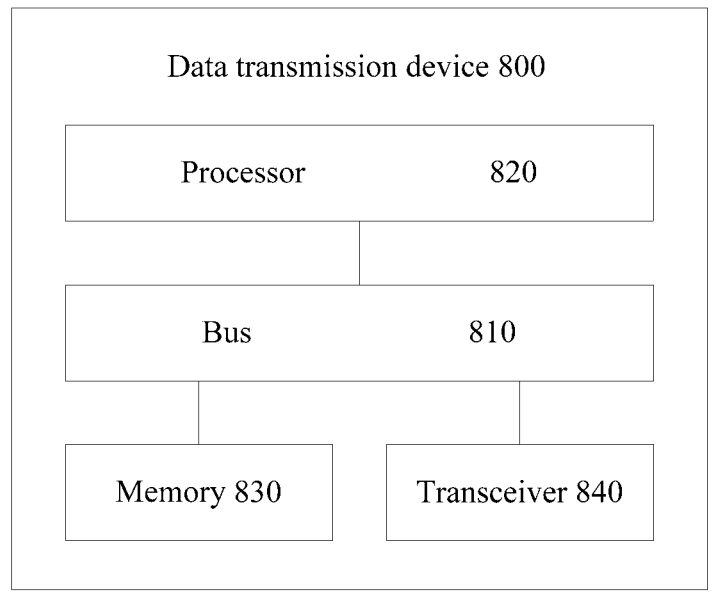
FIG. 12 is a schematic structural diagram of a data transmission device according to another embodiment of the present invention.

FIG. 12 is a data transmission device 800 according to an embodiment of the present invention. As shown in FIG. 12, the device 800 includes:

a bus 810;

a processor 820 connected to the bus 810;

a memory 830 connected to the bus 810; and a transceiver 840 connected to the bus 810.

The processor 820 invokes, by using the bus 810, a program stored in the memory 830, so as to: receive, by using the transceiver 840, spatial reuse transmission signaling sent by a primary access point, where the spatial reuse transmission signaling is corresponding to a determining result obtained after the primary access point performs determining processing according to a determining parameter, and the determining processing is used to determine whether a reuse transmission device of a spatial reuse link is allowed to use all or some of time-frequency resources of a primary link to transmit data; and send an uplink data frame to the primary access point by using the transceiver 840, where the uplink data frame carries the spatial reuse transmission signaling, so that the reuse transmission device of the spatial reuse link obtains the spatial reuse transmission signaling from the uplink data frame, and performs, according to the spatial reuse transmission signaling, data transmission processing based on the spatial reuse link.

Optionally, the spatial reuse transmission signaling includes first spatial reuse transmission signaling that is used to indicate that the reuse transmission device is prohibited from using all or some of the time-frequency resources of the primary link to transmit data; or the spatial reuse transmission signaling includes second spatial reuse transmission signaling that is used to indicate that the reuse transmission device is allowed to use all or some of the time-frequency resources of the primary link to transmit data.

Optionally, when there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the reuse transmission device is allowed to use a corresponding transmission sub-bandwidth, and N≥2. The transceiver 840 is specifically configured to:

add the N pieces of spatial reuse transmission signaling to a signaling A field of an uplink data frame on each of the N transmission sub-bandwidths, where N≥2; or add, to a signaling A field of an uplink data frame on an $m^{th}$ transmission sub-bandwidth in the N transmission sub-bandwidths, an $m^{th}$ piece of spatial reuse transmission signaling corresponding to the $m^{th}$ transmission sub-bandwidth, where m≥1.

Optionally, the spatial reuse transmission signaling includes power indication information. The power indication information is used to indicate maximum transmit power that can be used when the reuse transmission device uses all or some of the time-frequency resources of the primary link to transmit data.

Optionally, the spatial reuse transmission signaling is determined by the primary access point according to the determining parameter. The determining parameter is maximum interference power that is allowed when the primary access point receives the uplink data frame sent by the device 800.

The data transmission device 800 in this embodiment of the present invention may be corresponding to the primary station in the data transmission method in the embodiments of the present invention. The modules in the data transmission device 800 and the foregoing other operations and/or functions are used to implement the corresponding procedures of the method 200 in FIG. 5. For brevity, details are not described herein again.

Figure 13:
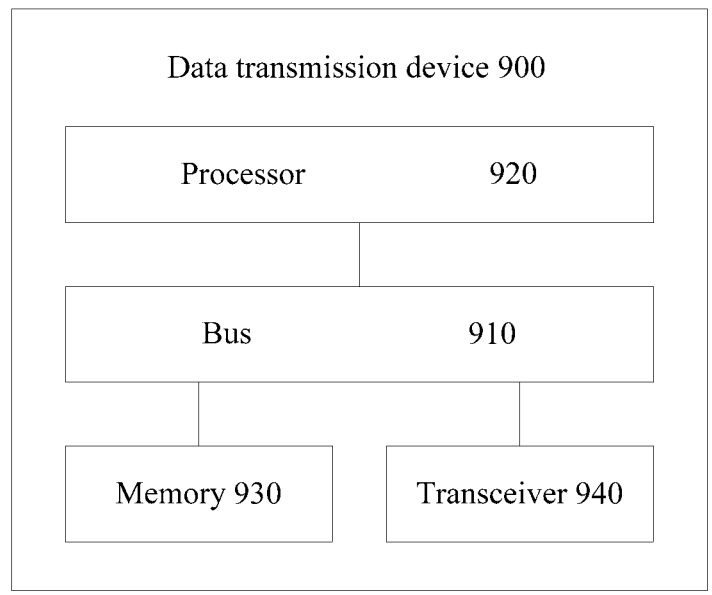
FIG. 13 is a schematic structural diagram of a data transmission device according to still another embodiment of the present invention.

FIG. 13 is a data transmission device 900 according to an embodiment of the present invention. As shown in FIG. 13, the device 900 includes:

a bus 910;

a processor 920 connected to the bus 910;

a memory 930 connected to the bus 910; and a transceiver 940 connected to the bus 910.

The processor 920 invokes, by using the bus 910, a program stored in the memory 930, so as to receive first spatial reuse transmission signaling by using the transceiver 940. The spatial reuse transmission signaling is corresponding to a determining result obtained after a primary access point performs determining processing according to a first determining parameter. The determining processing is used to determine whether the device 900 of the spatial reuse link is allowed to use all or some of time-frequency resources of a primary link to transmit data.

The processor 920 invokes, by using the bus 910, the program stored in the memory 930, so as to perform, according to the first spatial reuse transmission signaling, data transmission processing based on the spatial reuse link.

Optionally, when the spatial reuse transmission signaling includes second spatial reuse transmission signaling that is used to prohibit the device 900 from using all or some of the time-frequency domain resources of the primary link to transmit data, the processor 920 is specifically configured to give up, according to the second spatial reuse transmission signaling, using all or some of the time-frequency resources of the primary link to transmit data.

Optionally, when the spatial reuse transmission signaling includes third spatial reuse transmission signaling that is used to allow the device 900 to use all or some of the time-frequency domain resources of the primary link to transmit data, the processor 920 is specifically configured to perform, according to the third spatial reuse transmission signaling, data transmission processing based on the spatial reuse link.

Optionally, there are N pieces of spatial reuse transmission signaling, the N pieces of spatial reuse transmission signaling are in a one-to-one correspondence with N transmission sub-bandwidths of the primary link, each piece of spatial reuse transmission signaling is used to determine whether the device 900 is allowed to use a corresponding transmission sub-bandwidth, and N≥2. The processor 920 is specifically configured to perform, according to the N pieces of first spatial reuse transmission signaling, data transmission processing based on the spatial reuse link.

Optionally, when the result obtained after the determining processing is that the device 900 of the spatial reuse link is allowed to use all or some of the time-frequency resources of the primary link to transmit data, the spatial reuse transmission signaling includes power indication information.

The processor 920 is specifically configured to determine, according to the power indication information, maximum transmit power that can be used when all or some of the time-frequency resources of the primary link are used to transmit data. The transceiver 940 transmits data by using transmit power that is not greater than the maximum transmit power.

Optionally, the spatial reuse transmission signaling is determined by the primary access point according to the first determining parameter. The first determining parameter is determined by the primary access point according to a transmission parameter used by a primary station. The transmission parameter includes transmit power, a modulation and coding scheme MCS, and a transmission bandwidth.

Optionally, the device 900 and the primary access point belong to different basic service sets BSSs.

Optionally, the device 900 and the primary access point belong to a same basic service set BSS, and the spatial reuse link is used for D2D transmission between stations in the BSS.

Optionally, the transceiver 940 is specifically configured to add D2D transmission indication information to a data frame during the D2D transmission. The D2D transmission indication information is used to prohibit a D2D station in the BSS except the device 900 from using this D2D transmission opportunity.

Optionally, the first determining parameter is maximum interference power that is allowed when the primary access point receives an uplink data frame sent by the primary station.

Optionally, the processor 920 is specifically configured to determine the maximum transmit power according to a formula $P_{SR\_max}^{Tx} = \tilde{I}_{max\_level} \cdot L_{SR}$, where $P_{SR\_max}^{Tx}$ indicates the maximum transmit power, $\tilde{I}_{max\_level}$ indicates the maximum interference power, and $L_{SR}$ indicates a loss during transmission from the device to the primary access point.

Optionally, when a communications system further includes a third-party device, the processor 920 is specifically configured to generate fourth spatial reuse transmission signaling.

The transceiver 940 is specifically configured to add the fourth spatial reuse transmission signaling to the data frame during the data transmission, so that the third-party device gives up using this reuse transmission opportunity when receiving the fourth spatial reuse transmission signaling.

In this embodiment of the present invention, the processor may also be referred to as a CPU. The memory may include a read-only memory and a random access memory, and provides an instruction and data for the processor. A part of the memory may further include a nonvolatile random access memory (NVRAM). In specific application, the data transmission device may be or may be embedded in a standard Ethernet communications device such as a personal computer. The modules of the data transmission device are coupled together by using a bus system. In addition to a data bus, the bus system further includes a power bus, a control bus, and a status signal bus.

The processor can implement or execute the steps and the logical block diagrams that are disclosed in the method embodiments of the present invention. The processor may be a microprocessor; or the processor may be any conventional processor, a decoder, or the like. The steps of the methods disclosed with reference to the embodiments of the present invention may be directly executed by a hardware processor, or executed by a combination of hardware in a decoding processor and a software module. The software module may be located in a mature storage medium in the art, such as a random access memory, a flash memory, a read-only memory, a programmable read-only memory, an electrically-erasable programmable memory, or a register. The storage medium is located in the memory. A decoding unit or a processing unit reads information from the memory, and completes the steps in the foregoing methods in combination with hardware of the decoding unit or processing unit.

It should be understood that, in this embodiment of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or transistor logic device, a discrete hardware assembly, or the like. The general purpose processor may be a microprocessor; or the processor may be any conventional processor, or the like.

In an implementation process, the steps of the foregoing methods may be completed by using an integrated logic circuit of hardware in the processor or an instruction in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically-erasable programmable memory, or a register. The storage medium is located in the memory. The processor reads information from the memory, and completes the steps in the foregoing methods in combination with the hardware in the processor. To avoid repetition, details are not described herein again.

The data transmission device 900 in this embodiment of the present invention may be corresponding to the reuse transmission device in the data transmission method in the embodiments of the present invention. The modules in the data transmission device 900 and the foregoing other operations and/or functions are used to implement the corresponding procedures of the method 300 in FIG. 7. For brevity, details are not described herein again.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for detailed working processes of the foregoing system, apparatus, and unit, refer to the corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A primary apparatus, comprising:
   at least one processor;
   one or more memories coupled to the at least one processor and storing programming instructions for execution by the at least one processor to obtain information indicating spatial reuse transmission, wherein the information indicating spatial reuse transmission indicates whether or not a spatial reuse transmission apparatus of a spatial reuse link is allowed to perform spatial reuse transmission by using all or some of time-frequency resources of a primary link;
   wherein the information indicating spatial reuse transmission occupies 4 bits, wherein, when value of the 4 bits is 0, the information indicating spatial reuse transmission indicates that spatial reuse transmission is prohibited, and wherein one value of the 4 bits, which is different from 0, indicates an allowed maximum interference power; and
   a transceiver coupled to the at least one processor, the transceiver configured to send the information indicating spatial reuse transmission.

2. The primary apparatus according to claim 1, wherein the primary apparatus is a primary access point, and wherein the programming instructions are for execution by the at least one processor to generate the information indicating spatial reuse transmission.

3. The primary apparatus according to claim 1, wherein the primary apparatus is a primary station, and wherein the programming instructions are for execution by the at least one processor to generate the information indicating spatial reuse transmission.

4. The primary apparatus according to claim 1, wherein the primary apparatus is a primary station, wherein the programming instructions are for execution by the at least one processor to make the transceiver to receive a trigger frame, and wherein the trigger frame carries the information indicating spatial reuse transmission.

5. A primary access point, comprising:
   at least one processor;
   one or more memories coupled to the at least one processor and storing programming instructions for execution by the at least one processor to generate a trigger frame, wherein the trigger frame carries information indicating spatial reuse transmission which indicates whether or not a spatial reuse transmission apparatus of a spatial reuse link is allowed to perform spatial reuse transmission by using all or some of time-frequency resources of a primary link;
   wherein the information indicating spatial reuse transmission occupies 4 bits, wherein, when value of the 4 bits is 0, the information indicating spatial reuse transmission indicates that spatial reuse transmission is prohibited, and wherein one value of the 4 bits, which is different from 0, indicates an allowed maximum interference power; and
   a transceiver coupled to the at least one processor, the transceiver configured to send the trigger frame.

6. A spatial reuse transmission apparatus, comprising:
   at least one processor;

a transceiver coupled to the at least one processor, the transceiver configured to receive information indicating spatial reuse transmission, wherein the information indicating spatial reuse transmission indicates whether or not a spatial reuse transmission apparatus of a spatial reuse link is allowed to perform spatial reuse transmission by using all or some of time-frequency resources of a primary link;

wherein the information indicating spatial reuse transmission occupies 4 bits, wherein, when value of the 4 bits is 0, the information indicating spatial reuse transmission indicates that spatial reuse transmission is prohibited, and wherein one value of the 4 bits, which is different from 0, indicates an allowed maximum interference power; and one or more memories coupled to the at least one processor and storing programming instructions for execution by the at least one processor to perform spatial reuse transmission according to the information indicating spatial reuse transmission.

* * * * *